(12) United States Patent
Campbell

(10) Patent No.: US 9,805,611 B2
(45) Date of Patent: Oct. 31, 2017

(54) SYSTEM AND METHOD FOR ELECTRONIC AIRFIELD SIGNAGE

(71) Applicant: JCAI Inc., Mississauga (CA)

(72) Inventor: Jeffery P. Campbell, Cambridge (CA)

(73) Assignee: JCAI INC., Mississauga, Ontario (CA)

( * ) Notice: Subject to any disclaimer, the term of this patent is extended or adjusted under 35 U.S.C. 154(b) by 0 days.

(21) Appl. No.: 14/351,224

(22) PCT Filed: Oct. 12, 2012

(86) PCT No.: PCT/CA2012/000940
§ 371 (c)(1),
(2) Date: Apr. 11, 2014

(87) PCT Pub. No.: WO2013/053044
PCT Pub. Date: Apr. 18, 2013

(65) Prior Publication Data
US 2015/0002317 A1    Jan. 1, 2015

Related U.S. Application Data

(60) Provisional application No. 61/546,307, filed on Oct. 12, 2011, provisional application No. 61/616,738, filed on Mar. 28, 2012.

(51) Int. Cl.
| | | |
|---|---|---|
| *G08G 5/00* | (2006.01) | |
| *G08G 5/06* | (2006.01) | |
| *G09F 7/22* | (2006.01) | |
| *G09F 9/33* | (2006.01) | |
| *G09F 19/22* | (2006.01) | |
| *G06F 3/147* | (2006.01) | |

(52) U.S. Cl.
CPC .............. *G08G 5/06* (2013.01); *G09F 7/22* (2013.01); *G09F 9/33* (2013.01); *G09F 19/22* (2013.01); *G06F 3/147* (2013.01); *G09G 2380/06* (2013.01)

(58) Field of Classification Search
CPC .. G08G 5/0078; G08G 5/0026; G08G 5/0013; G08G 5/0082; G08G 5/045; G08G 5/0008; G08G 5/0043; G08G 5/0069; G08G 5/025; G08G 1/07; G08G 1/20; G08G 5/0065; G08G 5/06; G08G 5/065; G08G 9/00
USPC ....... 340/953, 945, 947, 952, 988, 989, 990, 340/949, 948, 959
See application file for complete search history.

(56) References Cited

U.S. PATENT DOCUMENTS

| | | | |
|---|---|---|---|
| 5,739,769 A | * | 4/1998 | Vladimir et al. ............. 340/945 |
| 6,282,417 B1 | * | 8/2001 | Ward ............................ 455/431 |

(Continued)

FOREIGN PATENT DOCUMENTS

| | | | |
|---|---|---|---|
| DE | 003840888 | * | 6/1990 |
| EP | 2250635 | | 8/2011 |

(Continued)

OTHER PUBLICATIONS

PCT International Searching Authority (ISA/CA), International Search Report and Written Opinion for PCT Appl'n No. PCT/CA2012/000940, Jan. 23, 2013.

*Primary Examiner* — Daniel Previl
(74) *Attorney, Agent, or Firm* — Gowling WLG (Canada) LLP; Jeffrey W. Wong

(57) ABSTRACT

An airfield sign that includes a dynamic display area.

7 Claims, 48 Drawing Sheets

(56) References Cited

U.S. PATENT DOCUMENTS

| | | | | |
|---|---|---|---|---|
| 7,818,100 | B2* | 10/2010 | Goodman et al. | 701/16 |
| 2004/0225440 | A1* | 11/2004 | Khatwa | G01S 19/15 |
| | | | | 701/301 |
| 2006/0167618 | A1* | 7/2006 | Werback | 701/120 |
| 2008/0310850 | A1* | 12/2008 | Pederson | G07C 9/00158 |
| | | | | 398/135 |
| 2011/0023338 | A1* | 2/2011 | Ellerton | 40/564 |

FOREIGN PATENT DOCUMENTS

| | | | |
|---|---|---|---|
| WO | 2006043943 | | 4/2006 |
| WO | WO 2006/043943 | * | 4/2006 |
| WO | WO 2006043943 | * | 4/2006 |

* cited by examiner

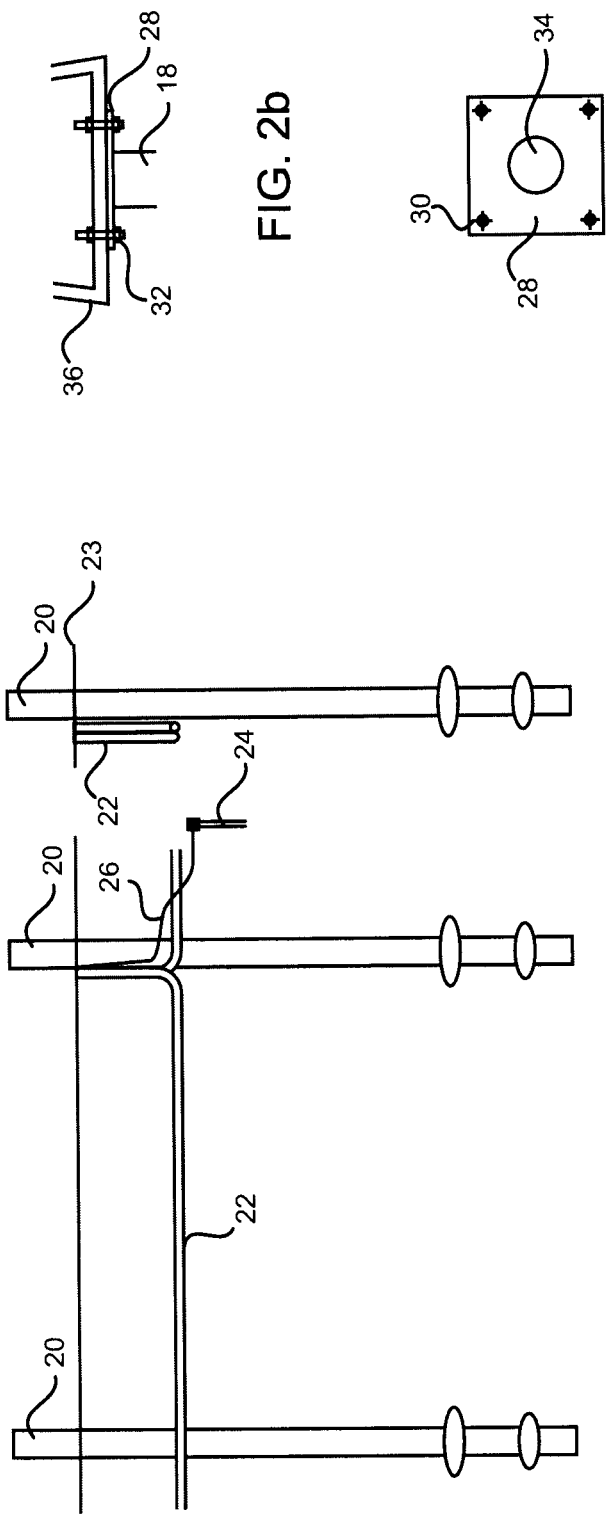

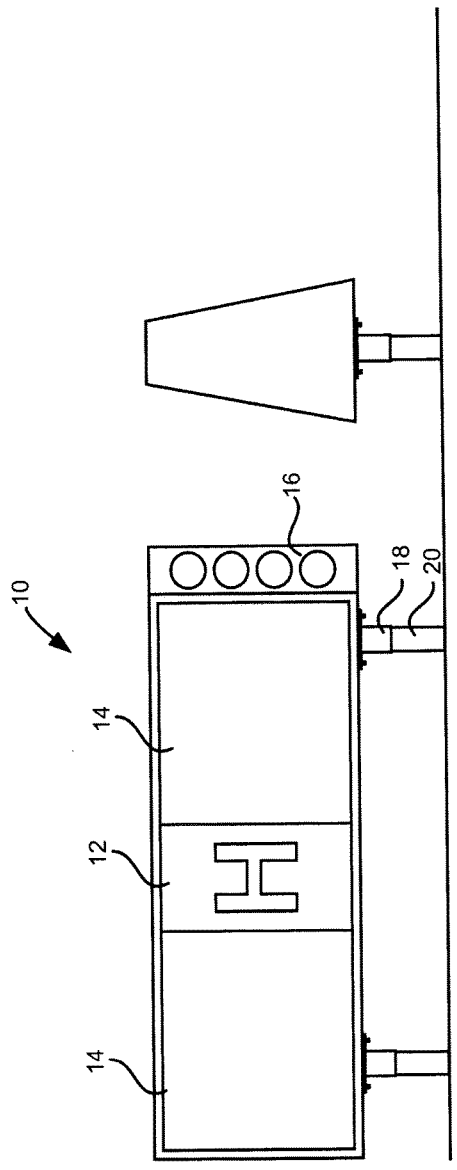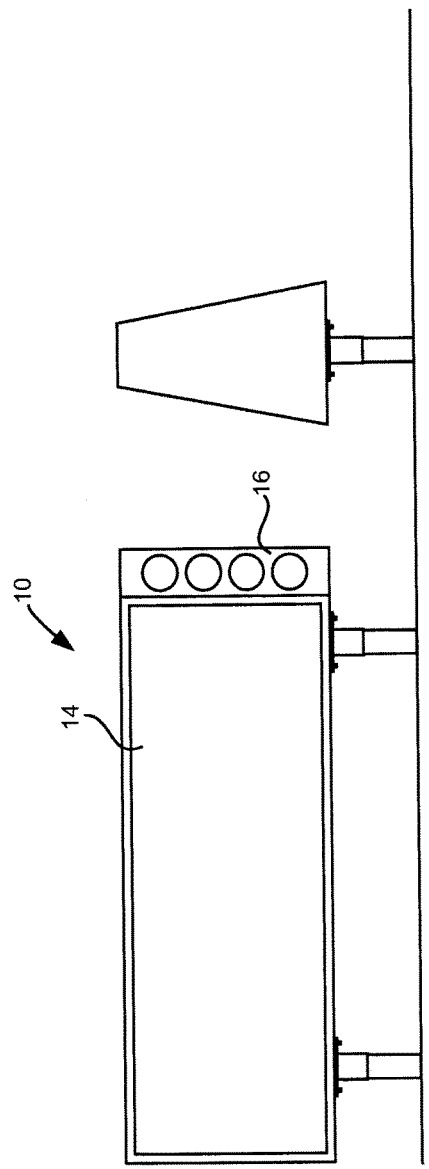

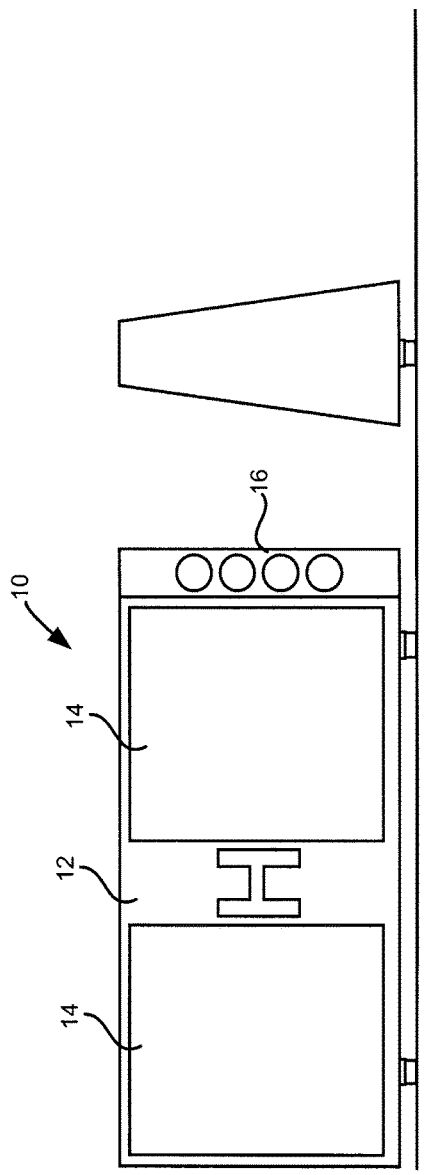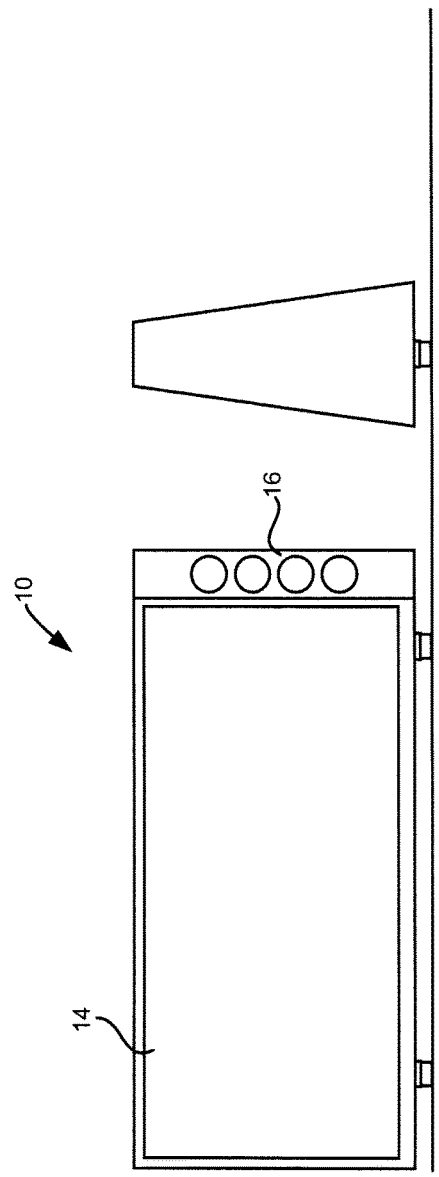
FIG. 7
FIG. 8

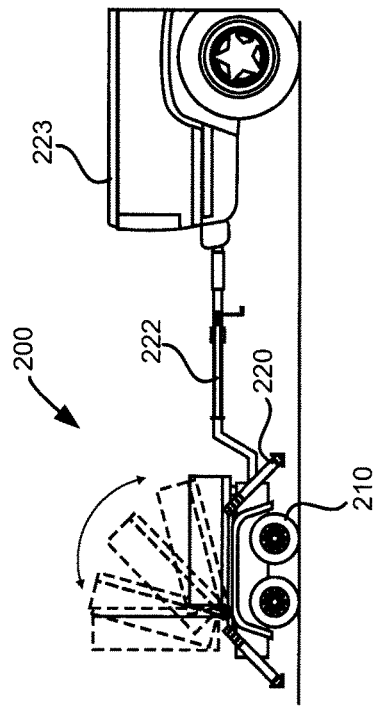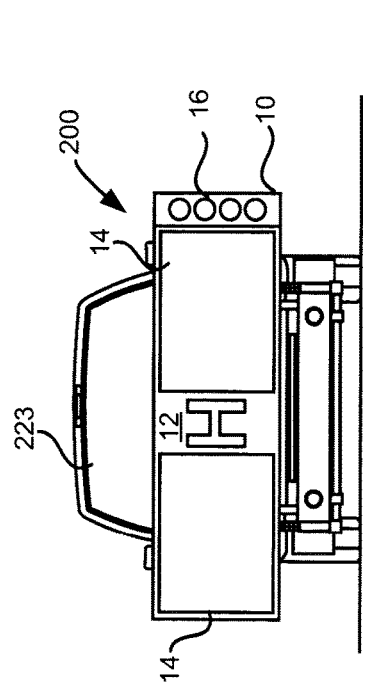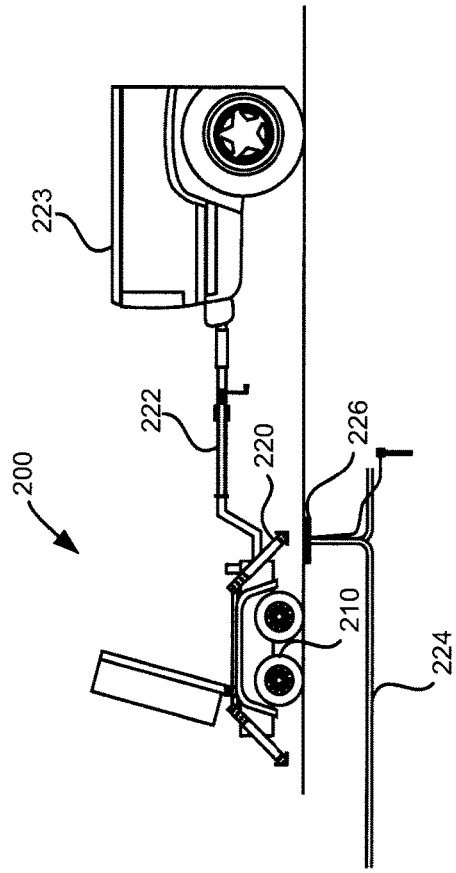

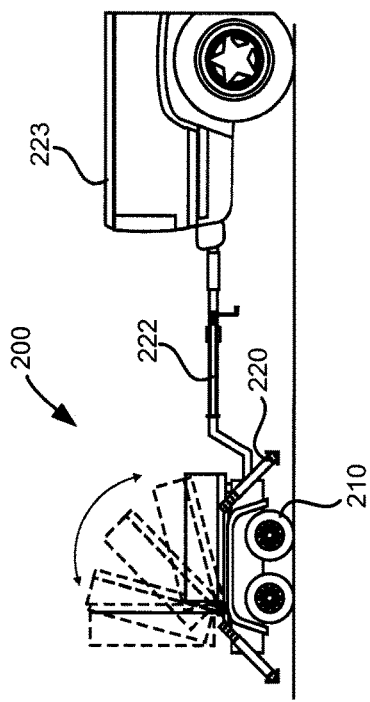
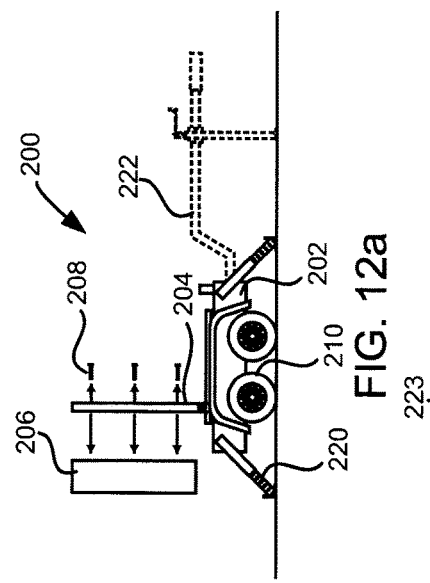
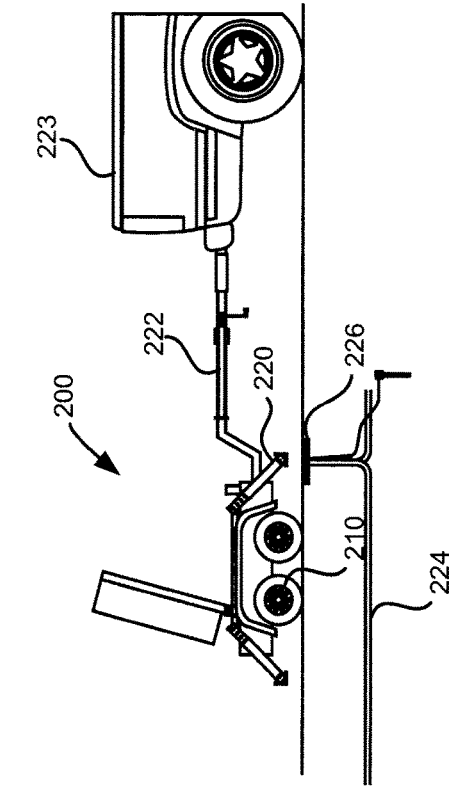
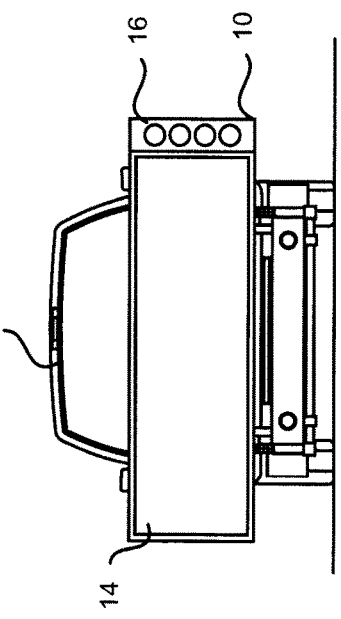
FIG. 12a
FIG. 12b
FIG. 12c
FIG. 12d

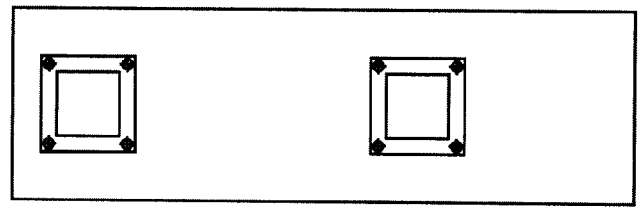
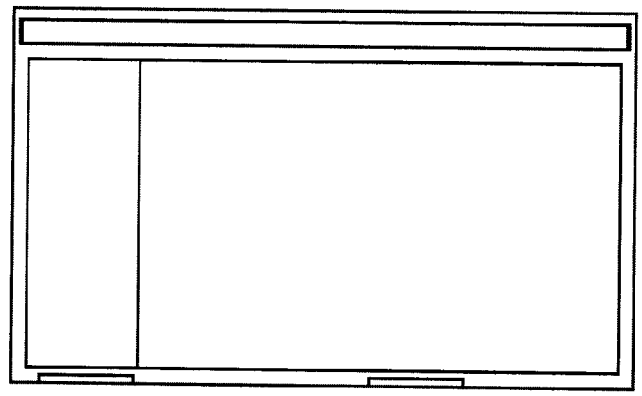
FIG. 21
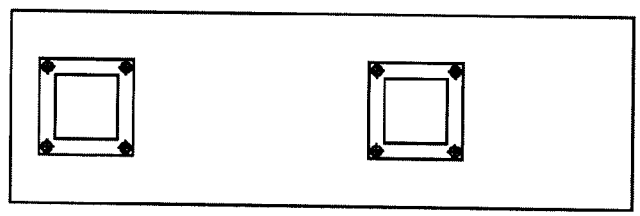
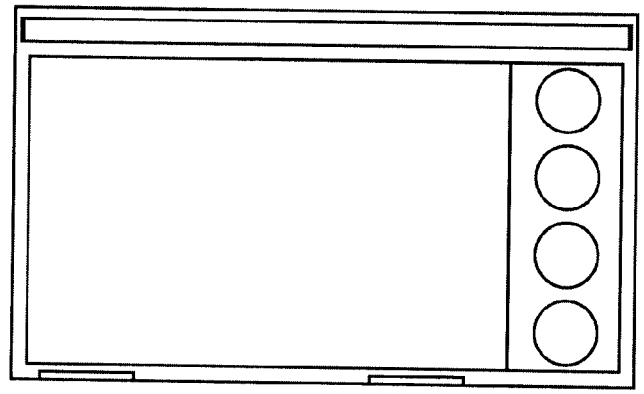
FIG. 22

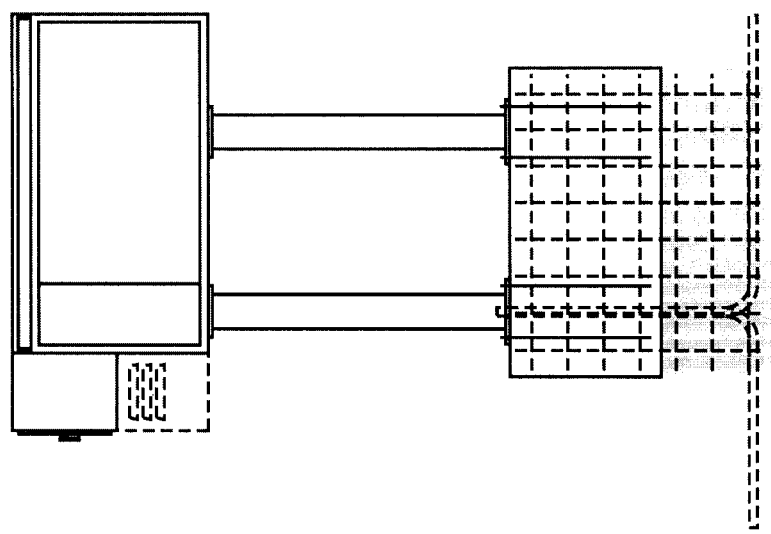

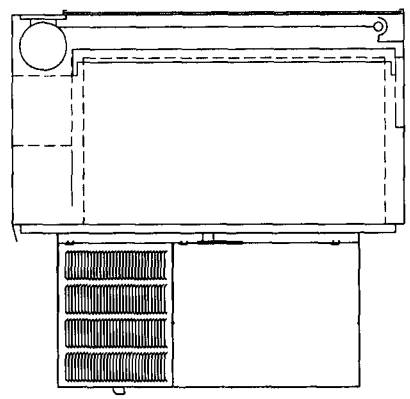
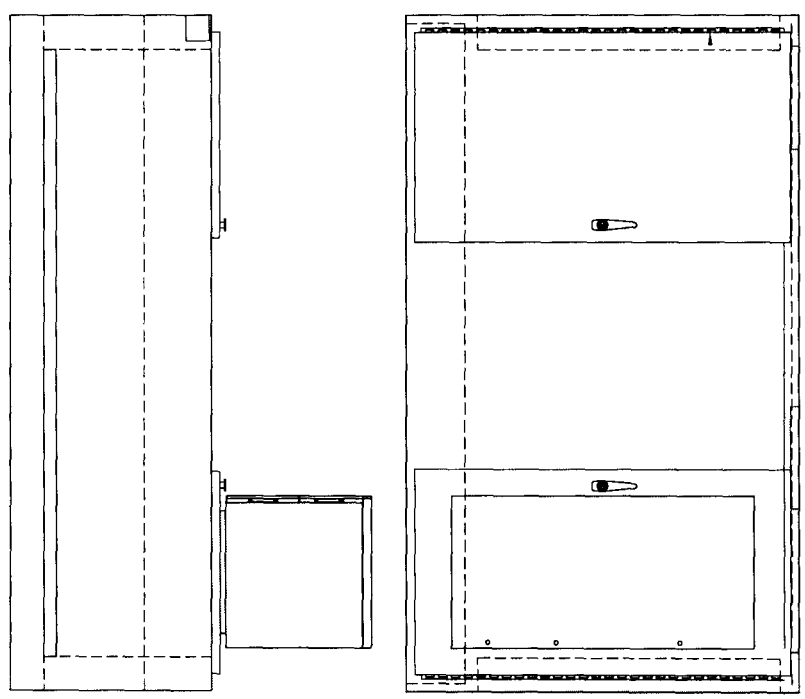
FIG. 25

| Batch Message | Screen Shots |
|---|---|
| {\D\8\4\R\24\STOP}<br>{\D\4\40\Y\11\CONFIGURE}<br>{\D\6\56\Y\12\AIRCRAFT}<br>{\D\107\4\R\7\\|}<br>{\D\107\25\R\7\\|} |  |
| {\D\0\0\Y\10\@}<br>{\D\0\15\Y\10\@}<br>{\D\0\30\Y\10\@}<br>{\D\0\45\Y\10\@}<br>{\D\0\60\Y\10\@}<br>{\D\109\0\Y\10\@}<br>{\D\109\15\Y\10\@}<br>{\D\109\30\Y\10\@}<br>{\D\109\45\Y\10\@}<br>{\D\109\60\Y\10\@}<br>{\D\20\24\Y\20\SLOW} | 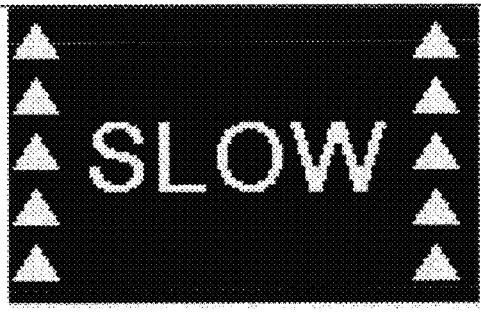 |
Figure 53

SYSTEM AND METHOD FOR ELECTRONIC AIRFIELD SIGNAGE

CROSS-REFERENCE TO OTHER APPLICATIONS

This application claims the benefit of U.S. Provisional Application Nos. 61/546,307 and 61/616,738 filed Oct. 12, 2011 and Mar. 28, 2012, respectively, and which are incorporated herein by reference.

FIELD

The present disclosure relates generally to signage. More particularly, the present disclosure relates to a system and method for electronic airfield signage.

BACKGROUND

In the field of aviation, when pilots are trying to land their airplanes, they rely on communication between the cockpit and the air traffic controller to determine the direction of approach and also to also be provided the runway they are landing on. After landing, the pilots can gather more information from conventional airfield signage which are located through the airfield/tarmac.

Most conventional airfield signs are static signs which provide minimal information to pilots and ground crew. The signs simply provide information relating to identification of runways and some directional information as well, however, pilots must determine which runway they are using.

It is, therefore, desirable to provide dynamic airfield signage that can be updated but remains visible to pilots and ground crew and meets the requirements and standards set for airfield signs.

SUMMARY

In a first aspect, the present disclosure provides an airfield signage system with a dynamic display aspect.

In a further embodiment, there is provided a mobile airfield signage system with a dynamic display.

In further aspect, the present disclosure provides an airfield sign with a dynamic display, a static display and a traffic light display and a method for remotely updating and changing the dynamic display and/or the traffic light display.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

FIGS. 2*a* to 2*c* illustrate various attachment components for the airfield sign;

FIGS. 3 to 9 illustrate various set-up and design options for the airfield signage;

FIGS. 10 to 13 illustrate optional configurations of a mobile airfield sign;

FIGS. 21 and 22 illustrate match plate detail for airfield signage;

FIGS. 24 and 25 illustrate another embodiment of an airfield sign;

FIG. 53 is a table showing airfield sign control messages.

DETAILED DESCRIPTION

Generally, the present disclosure provides a method and system for a dynamic electronic airfield signage. Pilots rely on airfield signage to direct their aircraft to the assigned takeoff or landing locations, or runways. By providing dynamic electronic airfield signage, any changes to runway assignments may be communicated to the pilot via the electronic airfield signage. This reduces the possibility of error if there is an communication equipment failure between the pilot and the air traffic control tower. Also, by having a dynamic airfield signage, flight information may also be added to the signage to further assist pilots in recognizing their runway assignment.

Figure 1:
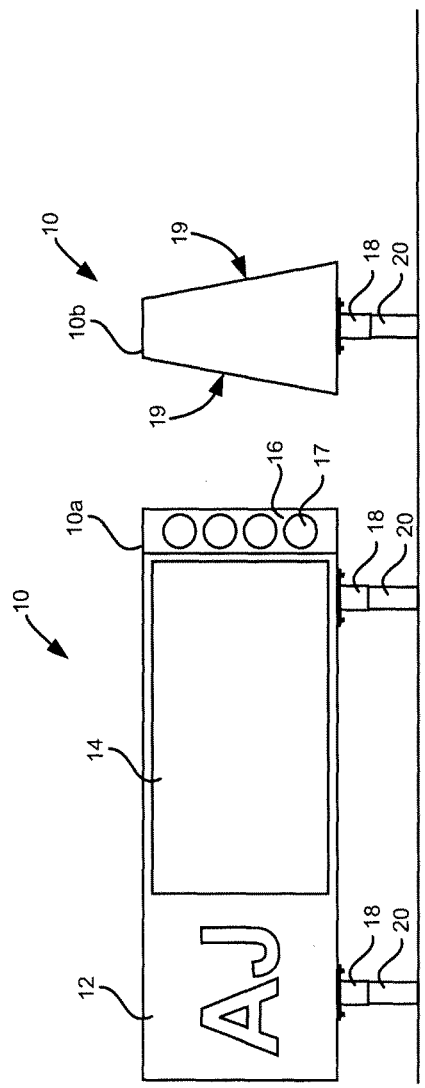
FIG. 1 illustrates a pair of airfield signs.

Turning to FIG. 1, a pair of electronic airfield signs are shown adjacent to each other. In the Figure, a pair of airfield signs 10 are shown with one of the airfield signage 10*a* being shown as a front view and a second airfield signage 10*b* shown as a side view.

As shown, the airfield sign 10 may include three display areas comprising a static portion or static display 12, a dynamic portion or dynamic display 14 and a traffic light portion or traffic light display 16.

The static display 12 may be internally illuminated and although, the static display 12 is located on a left hand side of the sign in FIG. 1, the static display 12 may be located on the right hand side, in the center, on the top or the bottom of the sign 10. The location of this static display 12 may depend on the location of the airfield sign 10.

In a preferred embodiment, the dynamic display 14 may be an LED display or other electronic illuminated display. The dynamic display 14 is configurable and displays messages based on the information obtained, or transmitted from a data source, such as a customer or airfield data source. This is explained in more detail below. In operation, a configurable set of messages are displayed on the dynamic display 14 of the airfield sign 10. A text-based configuration file may also be provided to allow the person controlling the sign to change the message shown on the dynamic display 14.

The dynamic display 14 is developed to be adaptable and customizable for displaying messages in a dynamic manner so that messages may be regularly changed to update the information being displayed by the sign 10. In the preferred embodiment, each airfield sign 10 is designed to identify specific information in an airfield, such as, but not limited to, Taxiways; Hold Positions; Stop Positions; Mandatory Instruction Signs; Under Construction Signs; or Proceed Positions. The message displayed by the dynamic display 14 may also relate to directing the aircraft to a desired area such as an Apron; Taxiway; Runway or Airfield.

The airfield sign 10 may also include a traffic light display 16 which includes a plurality of lighted circles 17 which function as a visible cue to observers, such as pilots or ground crew, to determine an appropriate course of action.

In a particular case, there could be two green circles and two red circles. When the green circles are illuminated, it is may be an indication that the aircraft may proceed but if the two red circles are illuminated, the aircraft is to stop. As with the static display, the traffic light display 16 may be located on either side of the sign 10 or may be located in the centre. The locations of the static display 12, the dynamic display 14 and the traffic light display 16 are variable and based on the design by manufacturer. The lights 17 may be LED or may be any other type of lighting.

In another embodiment, the arrangement of lights may be varied whereby there may be three lights, namely red, yellow (or amber) and green, with the red and green representation stop and go, respectively and yellow alerting the aircraft pilot to proceed with caution. In another example, the lights 17 may be multi-coloured lights and all the lighted circles may display the same colour or may change colour depending on the condition of the message trying to be transmitted.

As shown in the side view of the airfield sign 10b of FIG. 1, the front and rear faces 19 of the sign 10 may be slanted to improve readability. The sign 10 may also include a semi-permanent pole 18 to attach the sign to airfield poles 20 which cemented or fixed into the ground or the poles 18 may be a single piece which are dug into the ground.

Figure 52:
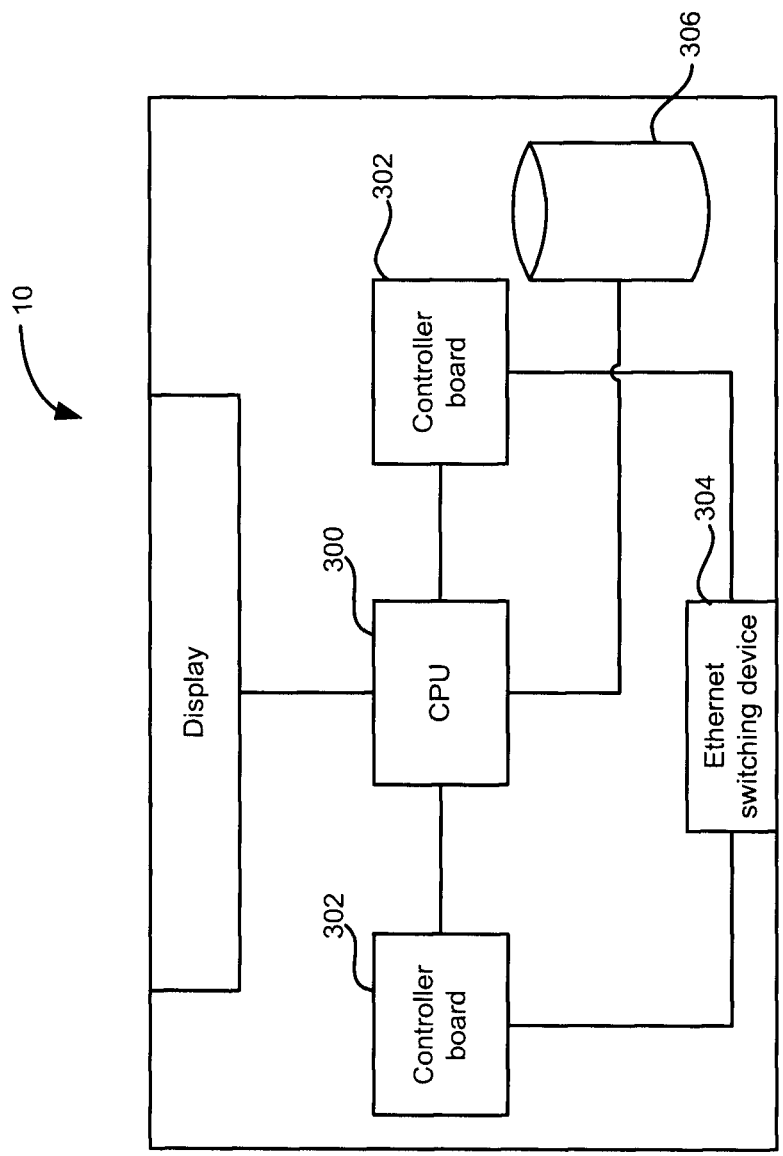
FIG. 52 is a schematic diagram of the internal structure of an airfield sign.

Turning to FIG. 52, a schematic diagram of the internal structure of an airfield sign is shown. The airfield sign 10 includes a main processor 300, such as a central processing unit (CPU) which is connected to a set of controller boards 302 which generate signals for the LED modules which light up the dynamic display area. In one embodiment, the controller boards 302 are connected to at least one Ethernet switching device 304.

For communication between the processor 300 or the controller boards 302 with external communication devices, it may be performed using cellular, Wi-Fi or fibre/copper Ethernet. If the cellular option is selected the controller boards 302 are connected to a cellular router with an option for multiple SIM cards (which can run on different cellular networks, providing a degree of redundancy). The cellular router is preferably outfitted with a SIM card which provides a static IP on the internet and configured to route signals on separate Ethernet software ports through to the correct controller board (Master/Slave). If the WiFi option is selected the controller boards 302 are connected to a WiFi Router. The router acts as a local wireless access point routing the control commands to the two controller boards. If the fibre Ethernet option is selected the controller boards 302 are connected to a combination copper/fibre Ethernet Switch.

An advantage of the current airfield sign is that there is a redundancy aspect to the system. As discussed above, each airfield sign 10 is equipped with a set of controller boards 302, preferably a Master board and a Slave board. These controller boards 302 are connected to a central board, or the CPU 300, which routes the signals from the controller boards 302 to the LED modules/dynamic display area. The Master controller board controls the centre board, or display using a low level TTL signal.

When in "In Control" control the output is on, when "Releasing Control" control the output is off. When the Master is in Control—the CPU 300 routes all of the signals from the Master controller board 302 to the LEDs within the display, when "Released" the CPU 300 routes all of the signals from the Slave Board 302 to the LEDs within the display 14.

The Master controller board 302 is controlled by the Ethernet control signals via the Ethernet switching device 304, however, when a "GET" command it switches the centre board to route signals from the Master controller board 302, when sent a "RELEASE" command it switches the centre board to route signals from the Slave controller board 302. A module within each controller board monitors the state of each controller board, and automatically switches from one to the other in the event of a failure.

Control of the airfield signs may be performed by a local/manual connection, an interface with other database or via a full interface.

If using a local/manual connection, a software module executing on a computer equipped with communication capabilities is contemplated. The operator selects the signs which he/she wants to display the message and presses a button on the screen for each message to be displayed on the sign. Data entry may be required to provide for the variable information required in some of the messages—including, but not limited to, Flight Number, Temperature and De-Icing start times. The messages are preferably all configurable, by way of editing simple text files on the system, without the need to alter any of the software module. If using an interface with other databases, a software module executing on a set of redundant servers equipped with communication capabilities communicates with the controller boards or CUP of the airfield sign 300. The sign information is transmitted from a customer supplied database and copies are stored in databases 306. A driver within the software module reads the database state for each De-Icing sign and sends the appropriate message to the correct sign or group of signs. In the event of communication loss or server failure the servers will automatically take over from the active server. The databases of the two servers are kept in synch using the WebServices. When using a full interface, in addition to the interface servers, Client Application programs are installed at the user communication device which allow the user to interact with the database, entering the aircraft information, and messages.

Messages from the servers to the controller boards are preferably in text format. A message is a text string with the predefined format with each section of the text representing a particular parameter. There are two categories of message—Command messages and Data messages. Command messages are used to send control commands to signs; data messages are used to send display content to signs. Therefore, by utilizing pre-determined codes, the dynamic display area of the airfield sign may be controlled via these messages. An example table is shown in FIG. 53.

Prior to operation, it may be beneficial to configure the controller boards 302. In a preferred embodiment, the controller boards 302 are loaded or configured with a communication setup; Base setup; Hardware setup; Firmware setup; and a Font Library setup.

In one example of a configuration procedure, a hardware scan may be performed to determine the controller board hardware. This will preferably also provide a list of the controllers which are integrated with a network. After the hardware scan, the communication setup may be performed. The user may then insert all of the necessary IP address or other information relating to communication characteristics so that the controller board may receive communicate with servers and the like. After the communication setup, the base setup may be performed which is then followed by a hardware setup to enter the hardware characteristics of the controller board. After these setups have been performed, software modules may be uploaded. If necessary, a font library may also be uploaded to the sign.

FIGS. 2a to 2c illustrate attachment components of the airfield sign 10. FIG. 2a provides a front view and side view. As understood, a portion of the airfield poles 20 is underground with ground level represented by the reference number 23. The airfield poles 20 are sufficiently deep as to provide adequate support for the airfield sign 10. Underground, a set of piping 22 is located adjacent the poles 20 and provide protection for the power cabling to be run to the sign 10 to operation the displays. If the airfield sign 10 is updated via Ethernet, fiber optics, or other wired connection to a server, the piping 22 may also protect this wiring. In the alternative, the airfield sign 10 may use wireless communication or data transmission which would reduce or eliminate the need for piping if the signs are powered internally. The sign 10, or the pole 20 may further include a ground rod electrode 24 that may contain a compression connector or thermite weld. A ground conductor 26 operatively connects the airfield sign 10 to the ground rod electrode 24.

FIG. 2c illustrates a base plate 28 for the airfield sign 10 and its attachment components. The base plate 28 includes a plurality of apertures 30 designed to receive fasteners 32 and another aperture 34 which is designed to receive the pole 18. The fasteners 32 may be anchor bolts which match and connect to nuts and washers. Other fasteners are possible to attach the base plate to a frame 36 or cabinet of the airfield sign 10 (as shown in FIG. 2b).

FIGS. 3 to 9 illustrate other design options for an airfield sign. As shown in FIG. 3, the airfield sign 10 may include two dynamic displays 14 on either side of a static display 12 with a traffic light display 16 at one end of the sign 10. As with the embodiment of FIG. 1, the sign 10 is mounted into the ground via the connection between the semi-permanent pole 18 and the airfield pole 20. In the embodiment of FIG. 3, the airfield sign 10 may update the dynamic displays 14 via a wired or wireless connection to a server.

Figure 5:
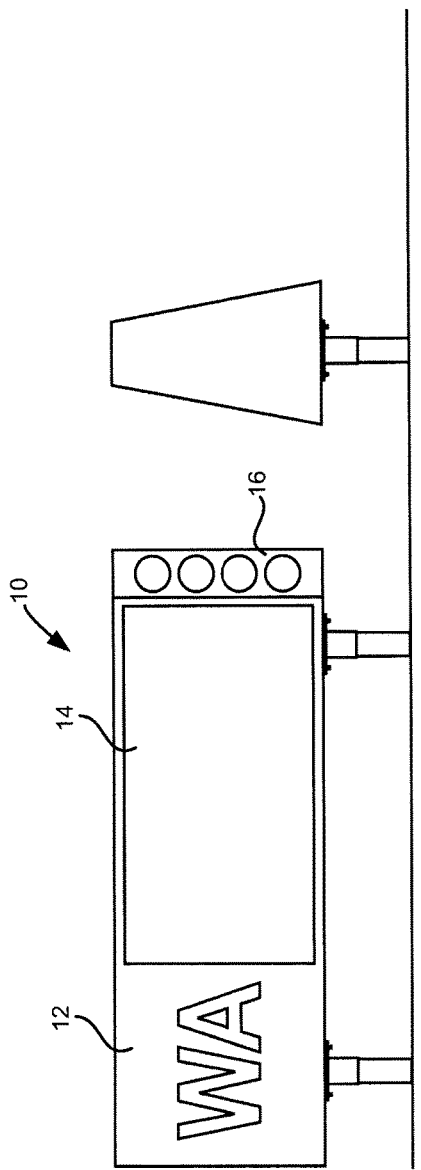
Figure 6:
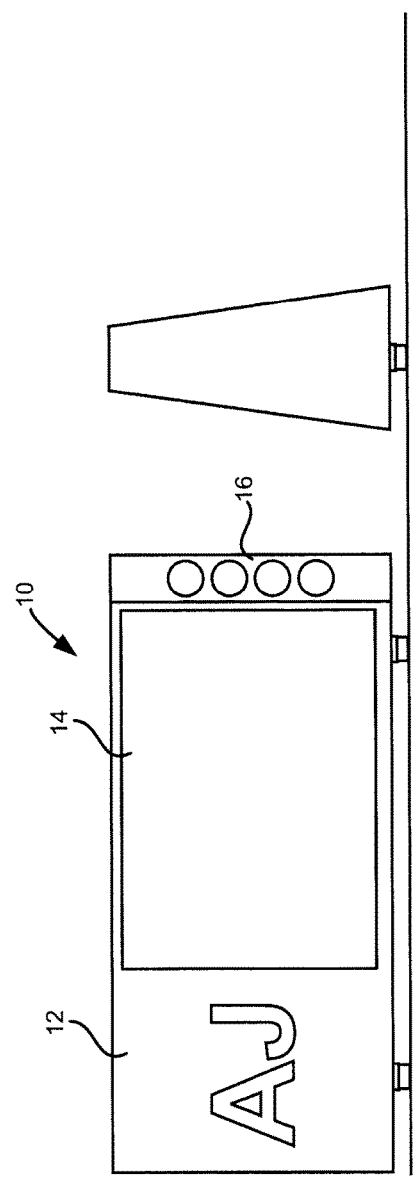
Figure 9:
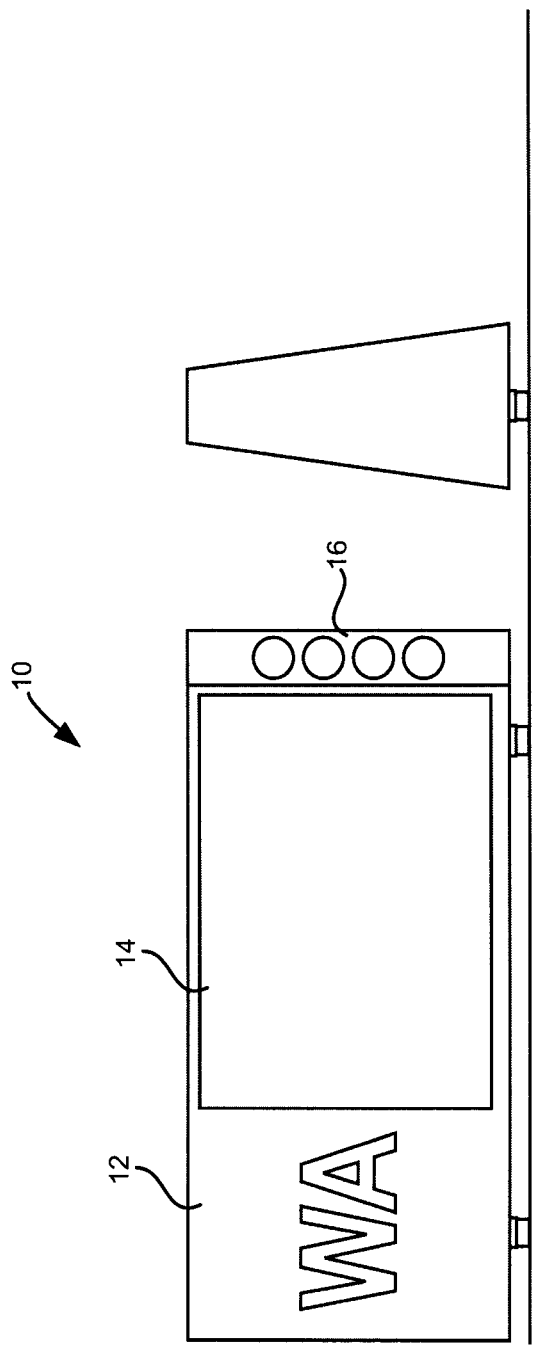

As seen in FIG. 4, the sign 10 comprises a single dynamic display 14 which may incorporate the majority of the face of the sign along with a traffic light display 16. In this embodiment, there is no static display. As shown in FIG. 5, the sign 10 includes a static display 12 along with a dynamic display 14 and a traffic light display 16. In this embodiment, the static display 12 may be manually changed or updated as required. Again, the message displayed on the dynamic display 14 is controlled remotely.

FIGS. 6 to 9 illustrate airfield signs that include larger displays and therefore, may be lower to the ground. Depending on the size of the displays, the angle tilt of the faces of the airfield sign 10 may be reduced. The attachment mechanisms for mounting the airfield sign to the airfield poles 20 are similar to those described with respect to FIGS. 2a to 2c. In these embodiments, with the larger displays, the pole(s) 18 may be adapted so that they can receive more of the pole 20 to result in a lower position in the airfield. It will be understood that the displays, namely static, dynamic or traffic light, may be in various orientations on the airfield sign and various sizes. The signs 10 shown in FIGS. 1 and 3 to 9 conform to airfield height and size requirements. Moreover, the colour of the lights in the traffic light display 16 can be adapted to conform to the visibility and colour standards of an airfield.

FIGS. 10 to 13 illustrate a mobile airfield sign system 200. The airfield sign system 200 in each of FIGS. 10 to 13 is identical with the only difference being the design of the sign 10 being moved. By including a mobile system, the airfield sign 10 may be mobile and moved throughout the airfield.

The moveable airfield sign system 200 comprises an outrigger 202 that may hold a base 204 of, or for, the airfield sign 10. The base 204 may be raised, lowered or pivoted through various positions, as shown FIG. 10b, and held in place via a rotatable fastener (not shown). The variable position is intended to improve the readability of the airfield sign 200. The movable airfield sign system 200 may further include a removable cabinet 206 or frame that may be connected to the base 204 via fasteners 208 such as bolts or screws.

Figure 10A:
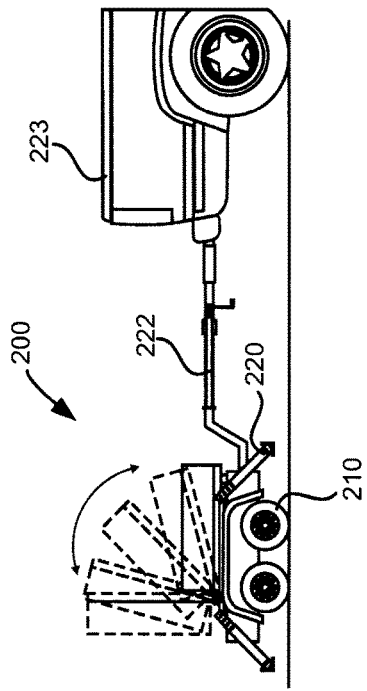
Figure 10B:
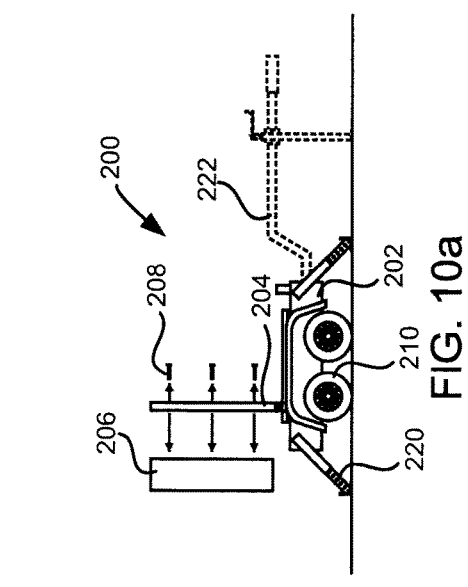
Figure 10C:
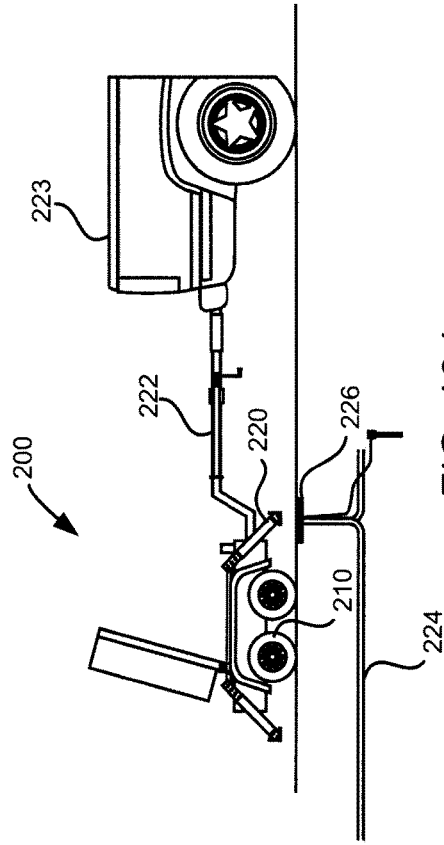
Figure 10D:
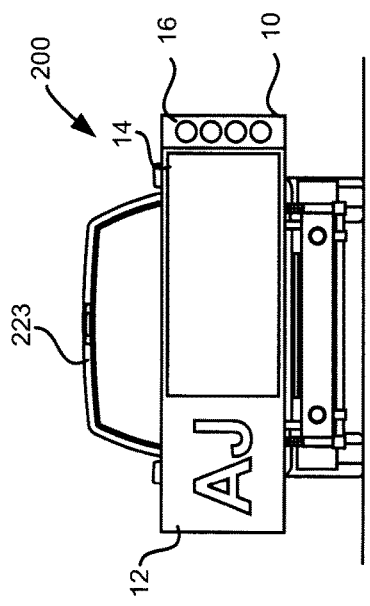
Figure 13B:
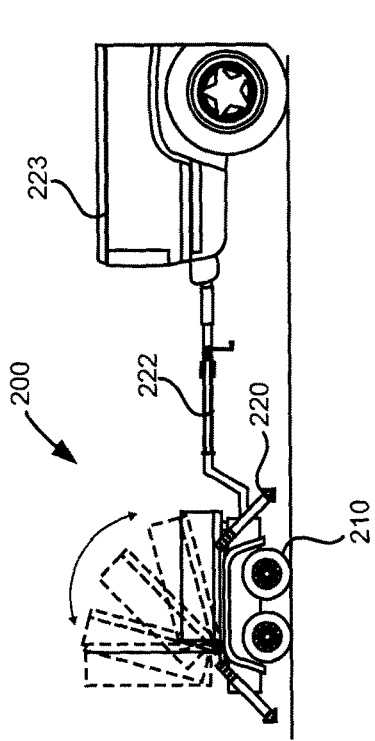
Figure 13A:
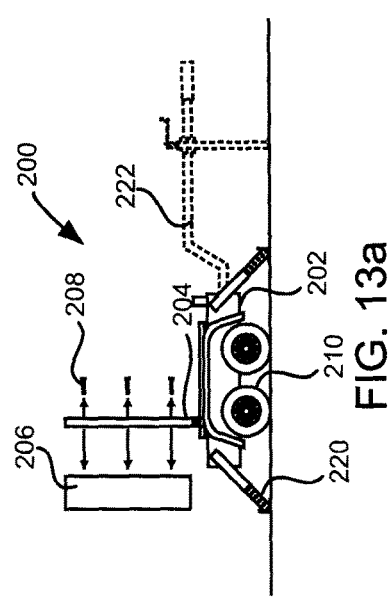
Figure 13C:
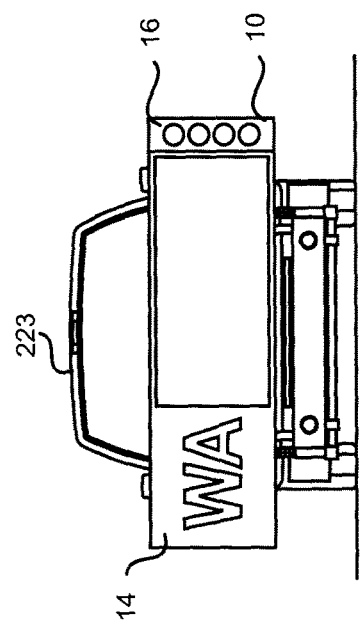
Figure 13D:
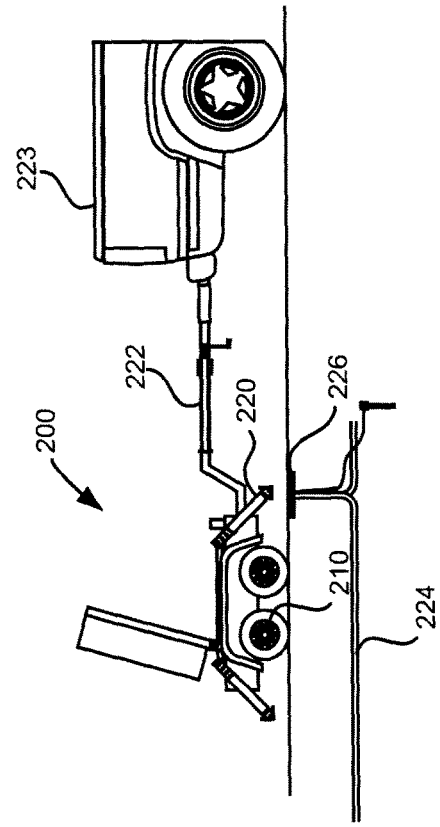

The outrigger 202 may contain a set of wheels 210 and a set of legs 220. The legs 220 may be raised or lowered depending on the grade of the ground and whether the airfield sign 10 is currently being towed. The outrigger 202 may also contain a removable tongue 222, which can be mounted to a hitch when the airfield sign 10 is being moved via a vehicle 223, or mounted to a receptacle when the airfield sign 200 is positioned in the airfield. As shown in FIG. 10d, in order to receive power for the sign 10, the tongue 222 may connect with the above wiring within the underground piping 224 in a similar manner as the airfield sign attachment as described in FIGS. 2a to 2c. In the alternative, the piping 224 may be connected to a sunken receptacle 226, which is adapted to receive a plug from the airfield sign 10. In another embodiment, the airfield sign 200 may be battery powered. The tongue 222 may also include adapters to connect with Ethernet or other wired connection in order to receive data from a remotely located airfield signage system server.

The airfield sign 10, although mobile, continue to conform to airfield height and size requirements.

As in the previous figures of the airfield signs, the airfield sign 10 within the mobile airfield sign system 200 includes at least the dynamic display 14 and the traffic light display 16. In some embodiment, the sign 120 may also include a static display 12. As shown in FIGS. 10 to 13, the static display 12 (when present), the dynamic display 14 and the traffic display 16 may be in various orientations or configurations, including having multiple dynamic displays 14, as shown in FIG. 11c, or having one large dynamic display 14 and the traffic light display 16, as shown in FIG. 12c. In an alternative embodiment, the traffic light display 16 may be incorporated into the dynamic display 14.

As the traffic light display 16 is not typically relied upon to provide detailed information, and is more intended to serve as a quick visual cue, the airfield signs 10 that are merely informational may not need to include the traffic light display 16.

Figure 14:
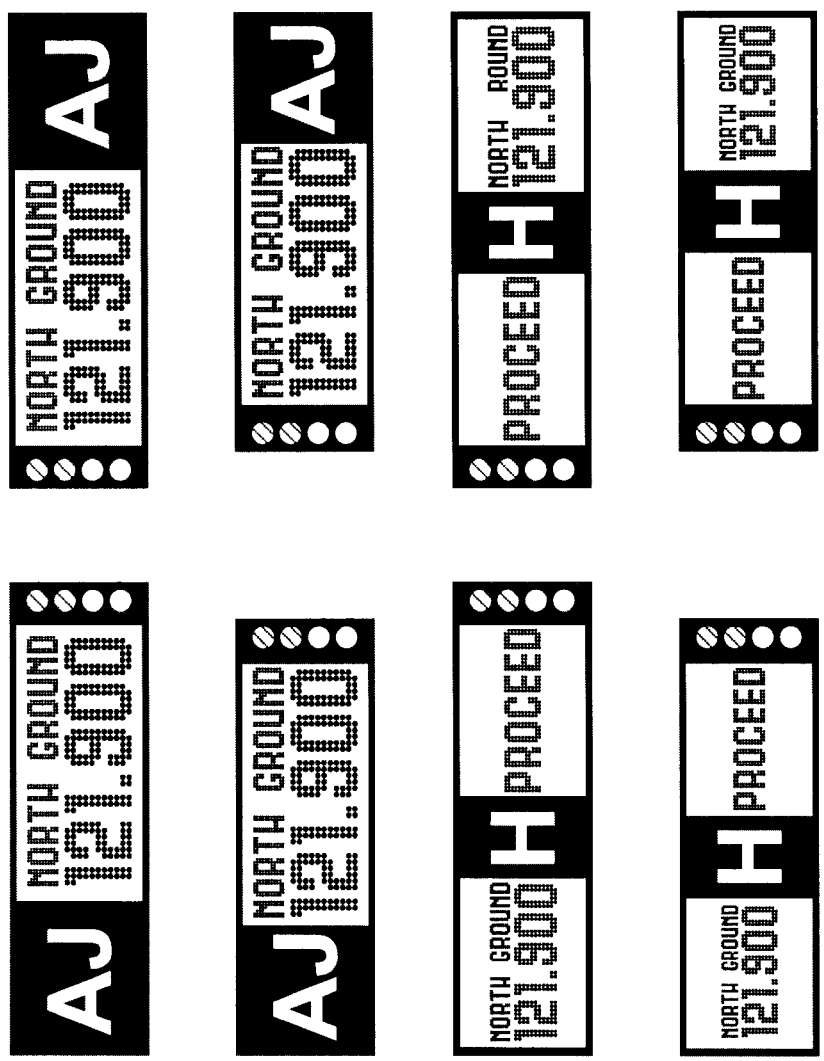
FIGS. 14 to 16 illustrate specific set-up examples of the airfield signage.
Figure 15:
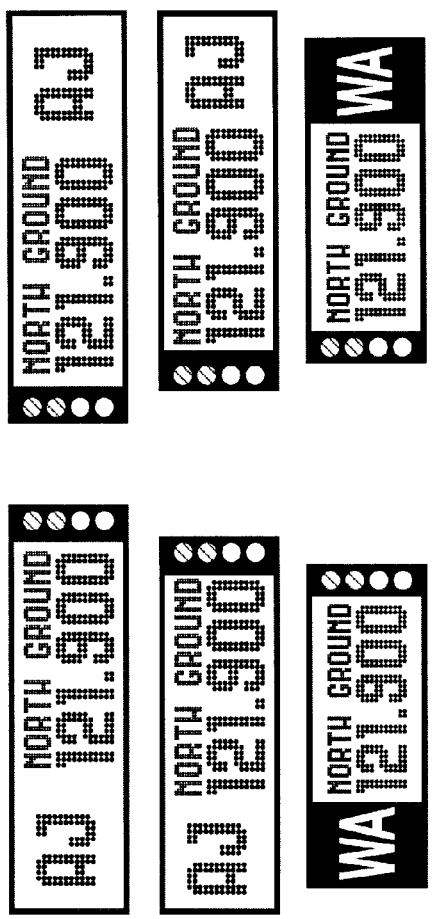
Figure 16:
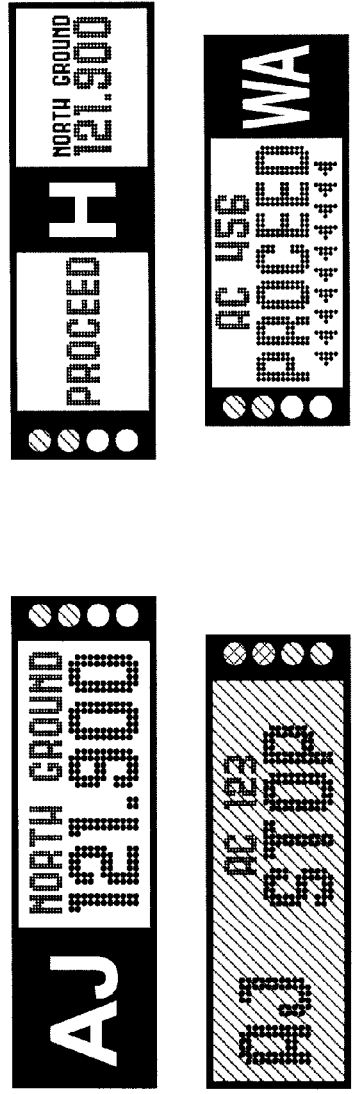

Particular examples of the signage or information being displayed on the airfield signs 10 are shown in FIGS. 14 to 16. It will be understood that the text in the dynamic display regions 14 may be changed either through a wired or wireless connection between a processor within the sign 10 and a remote server, such as an airfield signage system server. It will be further understood that the traffic light display 16 can be similarly changed or updated. If required, the static display 12 can be changed manually but preferably contains information that does not need to be frequently updated. These examples are intended to show the versatility of the airfield sign 10 and the airfield signage should not be considered to limited to the text or display configurations shown in FIGS. 14 to 16.

Each of the airfield signs 10 described above may operate via Ethernet based control boards or be PLC driven or both. The dynamic displays 14 or traffic light displays 16 may be linked via a fiber optic Ethernet or wireless network to the airfield signage system server.

In an alternative embodiment, there is an option for redundancy from the airfield signage system server to the airfield signs as described below. Further, the airfield signs' specific addresses, such as Internet Protocol Address, Media Access Control MAC address or other identification address, and the dynamic displays of the airfield signs may be updated or changed without the need for changes to the airfield signage system server code.

The airfield signage system servers that are operatively connected to processors within the airfield signs may execute software which links the customer or specific airfield's network with the signs. The servers communicate with an Object-Linking and Embedding OLE for Process Control OPC such as Allen-Bradley, Wonderware Intellution or Open Database Connectivity ODBC or Operational Database Administration ODBA such as MS SQL, Oracle, etc. to retrieve compliant data sources to obtain flight specific information and aircraft locations.

Figure 17:
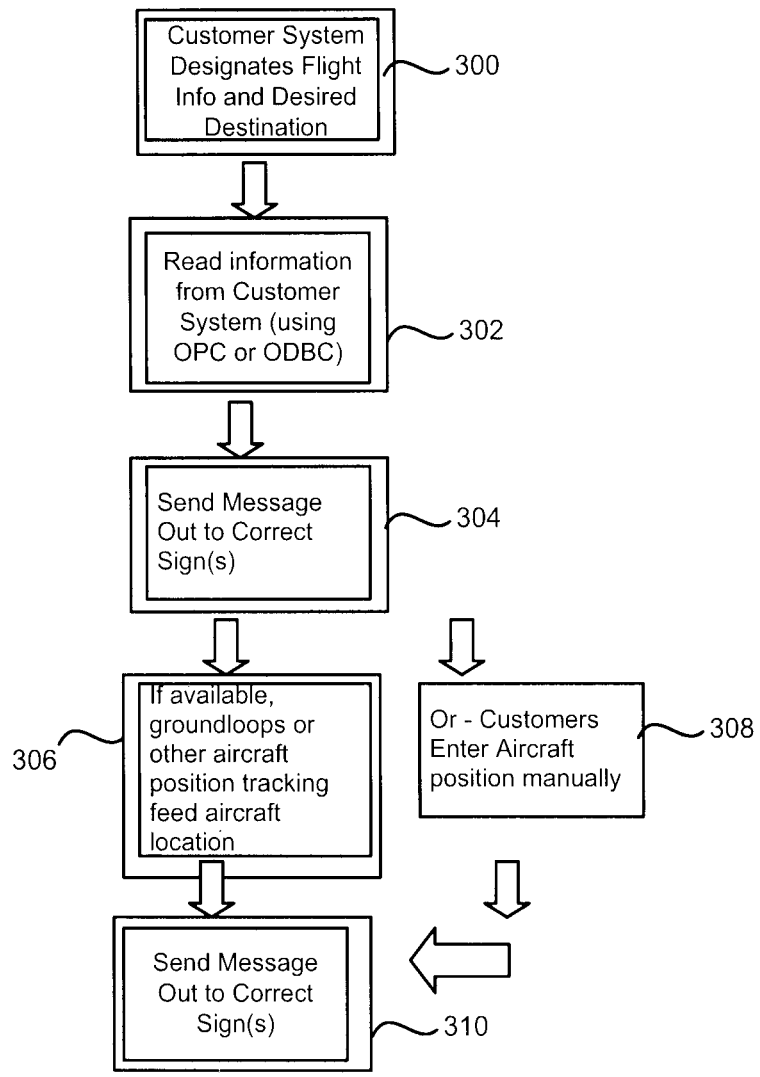
FIG. 17 illustrates a flow chart of the method for controlling the airfield signage.

FIG. 17 is directed at a flowchart outlining a method of controlling an airfield sign having a dynamic display portion. More specifically, the method is directed at the control of messages on the dynamic display of. Typically, a customer or a specific airfield has a system that designates flight information and desired destinations that is to be displayed on the various airfield signs throughout the airfield. This system will be pre-populated 300 with flight information. An apparatus, which controls one airfield sign, such as a processor within the sign, or a plurality of airfield signs, such as an airfield signage system server, accesses 302 this information from the customer, or remote, system or server. The apparatus may read this information using OPC or ODBC or through another communication platform. In the case where a plurality of airfield signs are being controlled by the airfield signage system server, the apparatus may then relay 304 this information to the appropriate airfield signs via a wired or wireless connection. The airfield signage system server may relay the information to one or a plurality of the signs depending on the information that is retrieved by the airfield signage system server. If there are available ground loops or other aircraft position tracking, this information may be fed 306 into the airfield signage system server and airfield sign system. If a tracking system is not available, the customer or employee of the specific airfield may enter an aircraft position manually into the system 308. The airfield signage system server will then access this information with the pre-populated flight information to confirm that the correct airfield signs are displaying the appropriate information on the dynamic displays and that the dynamic displays are updated 310 with respect to the aircraft position.

Figure 18:
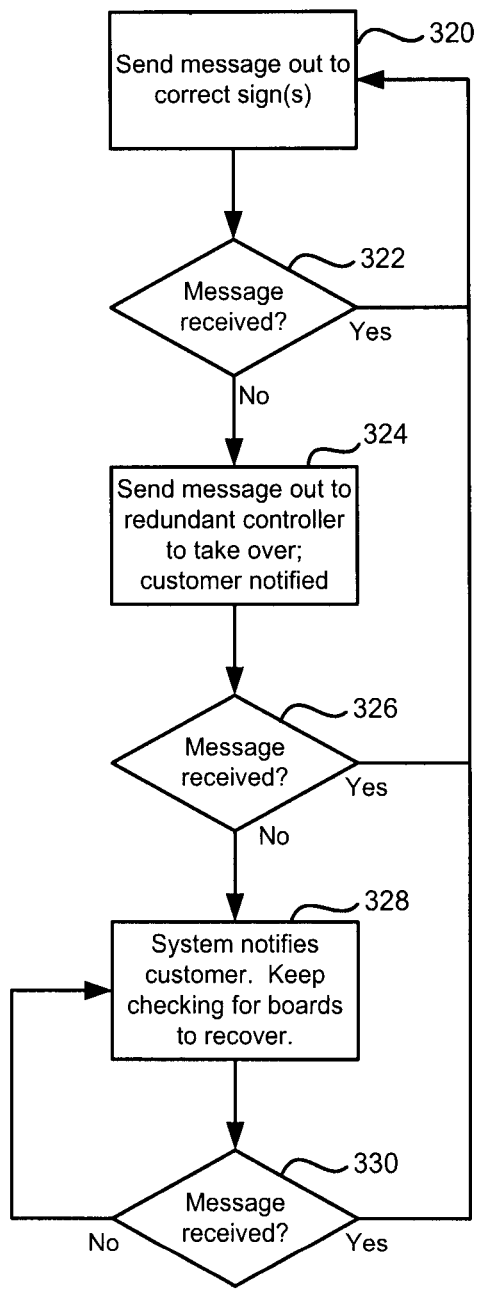
FIG. 18 illustrates a method for redundant airfield signage control.

FIG. 18 illustrates a method for creating redundancy in the airfield sign control. This redundancy is intended to improve the quality and accuracy of the message on the dynamic display. Assuming the control of a plurality of airfield signs, the airfield signage system server connected to the airfield sign system begins by sending 320 a message to one or more airfield signs so that the signs will update the display message. The airfield signage system server then determines whether each airfield sign received 322 the message and updated its display information accordingly. In one case, the system, or airfield signage system server waits a pre-determined time interval to receive a confirmation from the airfield sign stating that the message is updated. Other ways of confirming receipt of the message may also be incorporated and are contemplated. If this confirmation message is received the airfield signage system server may be in a position to send out another message to the airfield sign.

If it appears that the message was not properly received, the airfield signage system server sends 324 a message to a redundant controller to take over control of the airfield sign. At this point, the airfield signage system server may also send a message to the customer to notify them that one of the airfield signs does not appear to be functioning. After sending the message to the redundant controller, the airfield signage system server determines whether the message has been received 326. If there is a confirmation message from the redundant controller the server may send out further messages.

If no confirmation is sent from the redundant controller, the airfield signage system server transmits an alert about the failure of the redundant controller. The system will continue to check or ping 328 the specific airfield sign to determine if it has returned online and if it has received the previous message. Once some form of confirmation has been received 330 by the system or the server, normal operation may continue so that subsequent messages may be transmitted to the problematic specific airfield sign. It will be understood that other messages can be sent to other airfield signs at any stage of the method and each message sent may follow this method of redundancy which is intended to ensure the dynamic display and traffic light display are displaying the appropriate messages or light cues.

Figure 19:
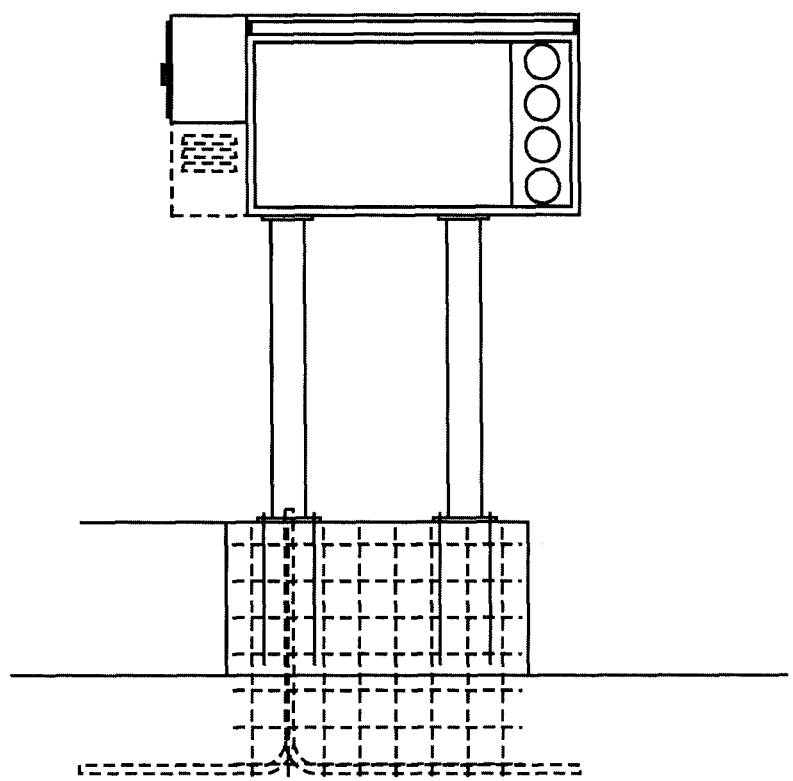
FIGS. 19 and 20 illustrate an embodiment of an airfield sign to be used in airfield signage.

FIGS. 19 and 20 illustrate another embodiment of an airfield sign. FIG. 19 illustrates a front view of the airfield sign. The airfield sign 100 includes an electrical panel 102 along with a display area 104 and a set of traffic lights 106 which may be light emitting diodes (LEDs) or Organic light emitting diodes (OLEDs). The sign 100 is attached to posts 108 or poles, preferably made of galvanized steel, through a match plate 110 which may be a steel plate fastened to the sign 100 and pole 108 through fasteners. The sign 100 is fastened through the bottom of the sign cabinet and matching plates are located on the posts and sign cabinet.

The posts may be further attached to a concrete base 112 through individual base plates 114. The base 112 may be buried to a level required by local code requirements and is preferable made of reinforced concrete and may contain am aperture to receive wiring to transmit power and data to the sign 100. In an alternative, the sign 100 may receive data wirelessly.

Figure 20A:
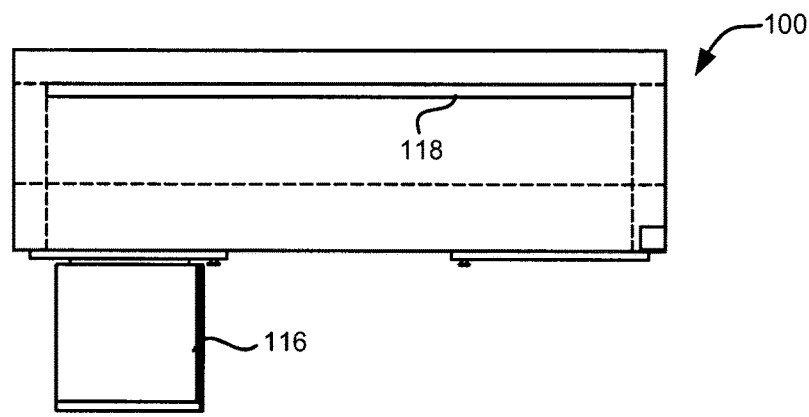
Figure 20B:
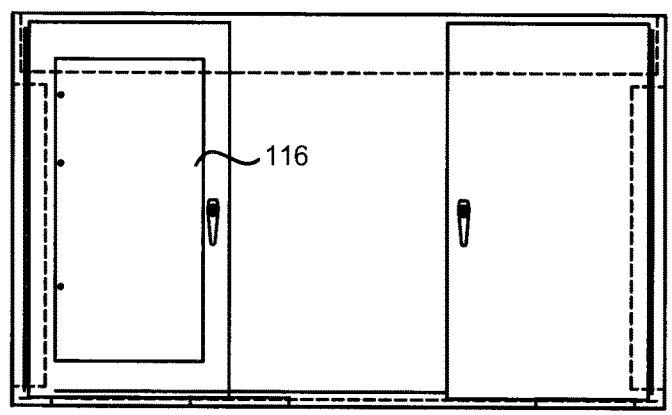
Figure 20C:
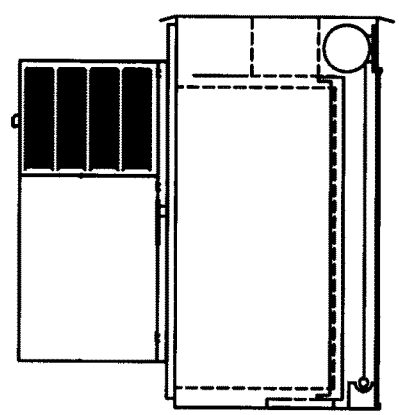
Figure 23A:
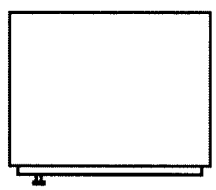
FIG. 23 illustrates a power unit for an airfield sign.
Figure 23B:
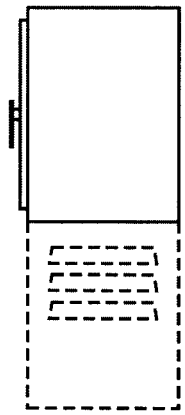
Figure 23C:
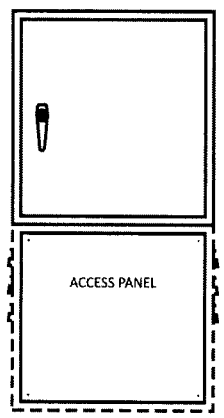
Figure 23D:
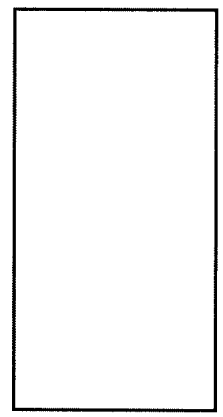

FIGS. 20a to 20c illustrate a top, back and side view of the embodiment of FIG. 19, respectively. As shown in FIG. 20a, an air conditioning unit 116 along with a U-shaped plate 118. From the back view (FIG. 20b), an opening, such as a door, to the air conditioning unit 116 and control panel can be seen. The design is adapted to allow access to the various controls and components used in the operation of the airfield sign. The side view (FIG. 20c) further illustrates the sign. The sign 100 may include a sign coating or protective facing, such as Lexan.

FIGS. 21 and 22 illustrate top and front views of two embodiments of an airfield sign. In particular, the matching plate and front configuration of the airfield sign is shown in these embodiments. The matching plates may be welded or otherwise fastened inside the sign cabinet structure and may be off-centre to allow for electrical panel width.

FIGS. 23a to 23d illustrate a power unit from a top view, side view, front view and back plate view, respectively. The side panels of the power unit may include vents or other apertures to allow heat to dissipate. The front view may have a screen or perforated bottom to further allow for cooling.

Figure 24A:
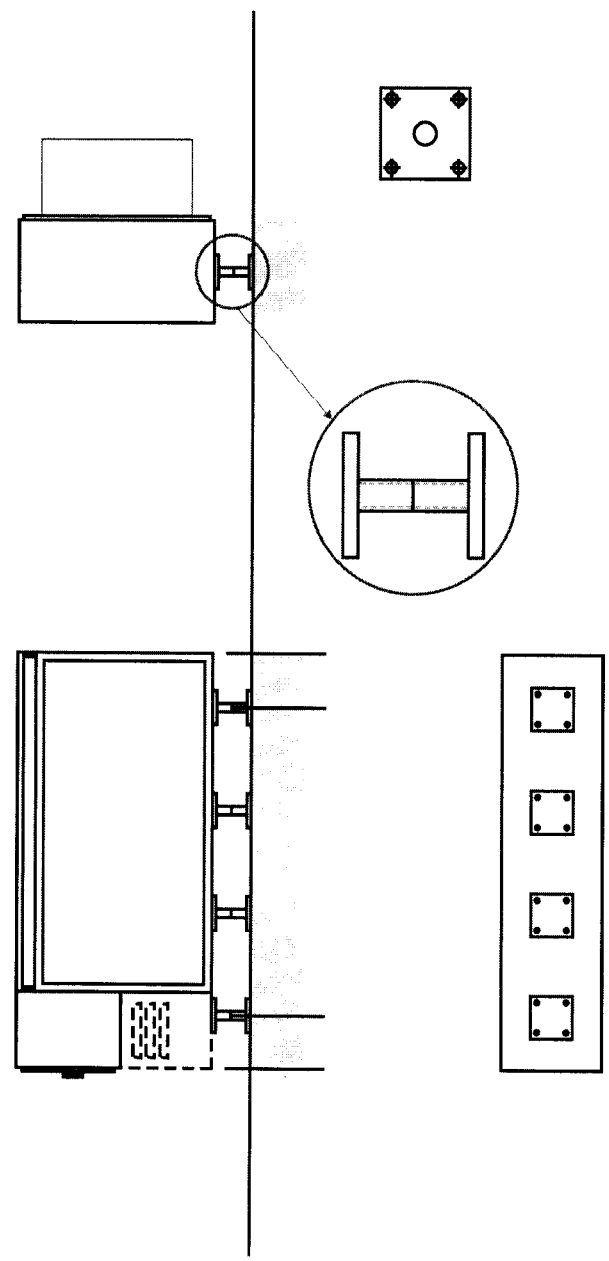

FIGS. 24A, 24B and 25 illustrate another embodiment of an airfield sign. In this embodiment, the sign may be seen as a housing or a cabinet in which the displays and electrical panels are housed. The sign includes a dynamic display area in the front of the sign cabinet. The cabinet may further include an electrical panel that may be attached to the side of the cabinet and may be attached to an air conditioning unit at the back side. The cabinet and electrical panel may be attached to posts through match plates and attached to a concrete base through base plates. The base plates and matching plates may be fastened through welding, bolts with matching nuts and washers, or the like. A frangible design may be used for the posts. The back view of the unit, as shown in FIG. 25 is similar to the back view described in FIG. 20. The back view is again shown without the power unit but with the air conditioning unit.

Figure 26:
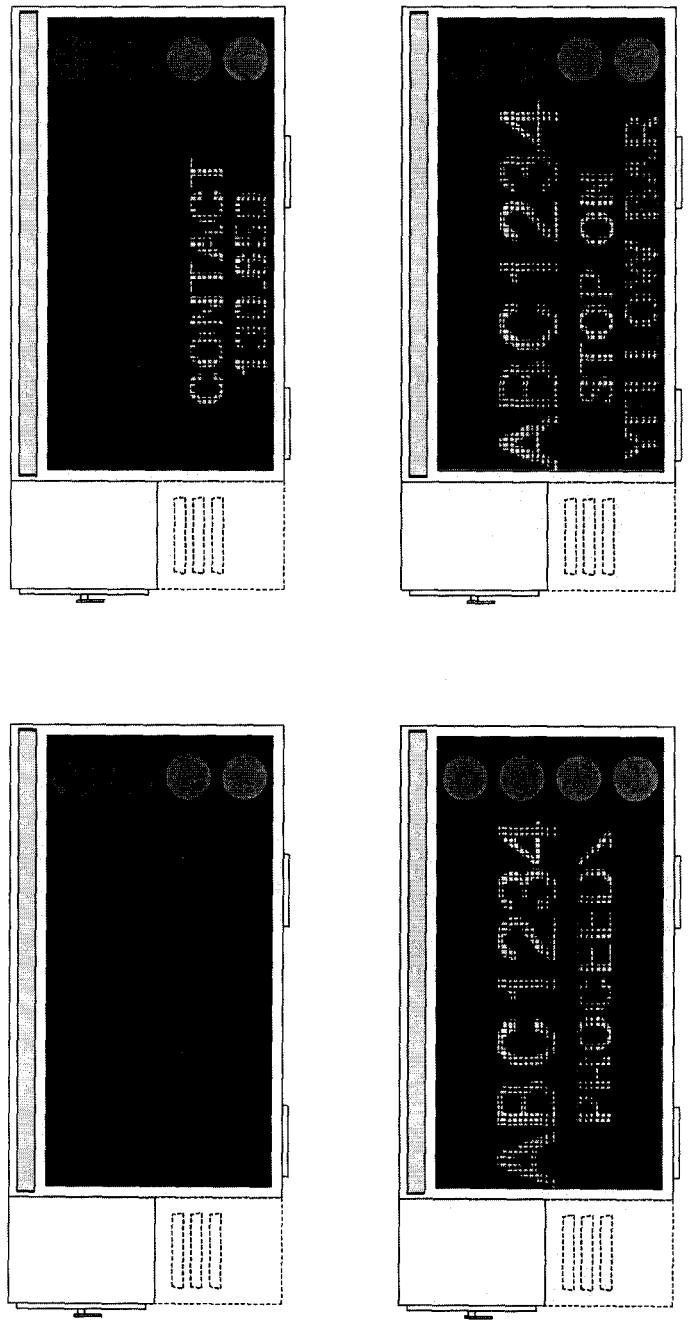
FIGS. 26 and 27 illustrate optional configurations of an embodiment of an airfield sign.
Figure 27:
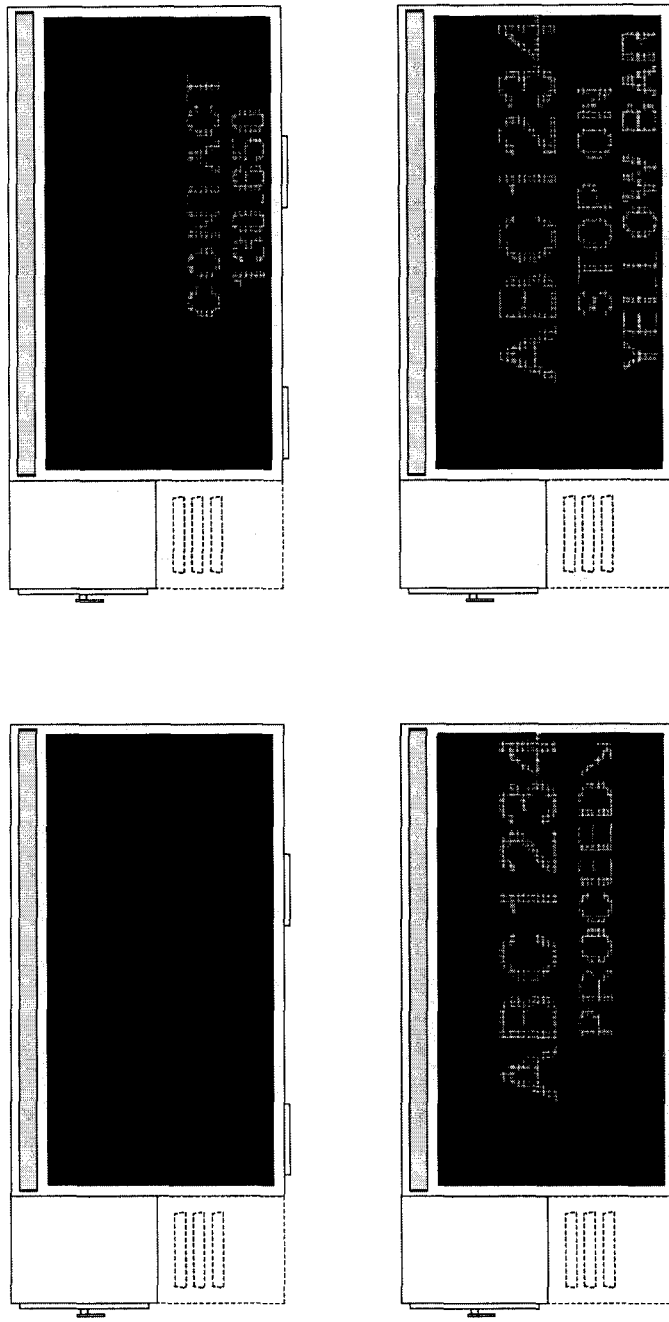
Figure 28:
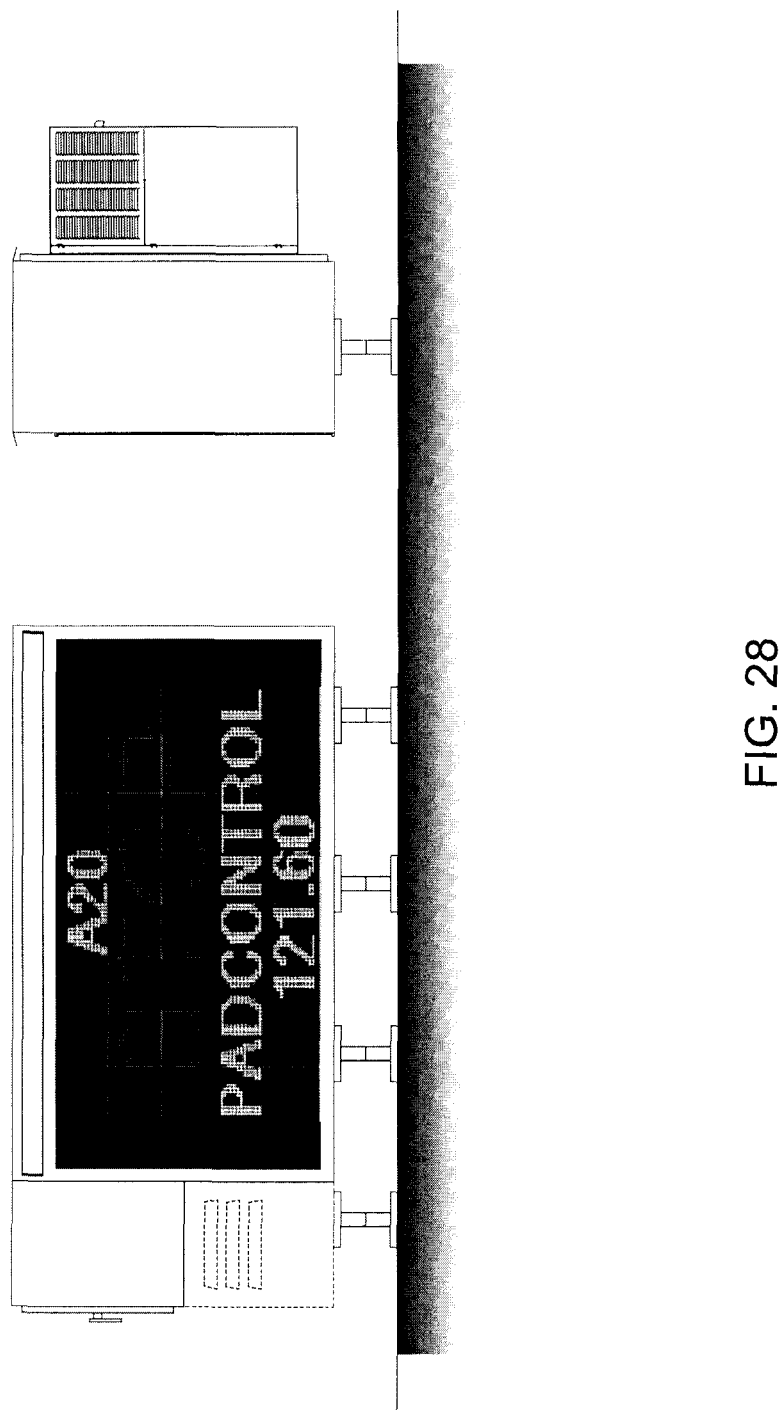
FIGS. 28 and 31 illustrate optional configurations of another embodiment of an airfield sign.
Figure 29:
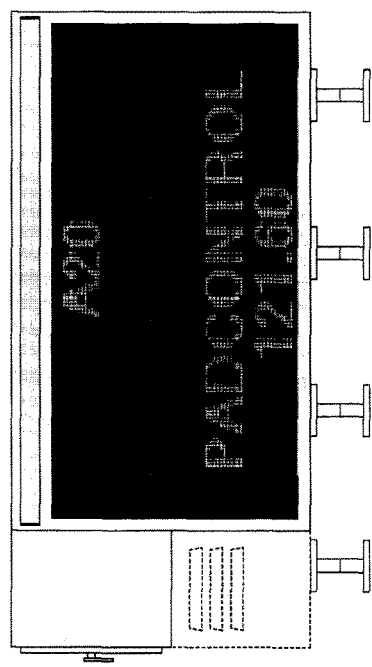
Figure 30:
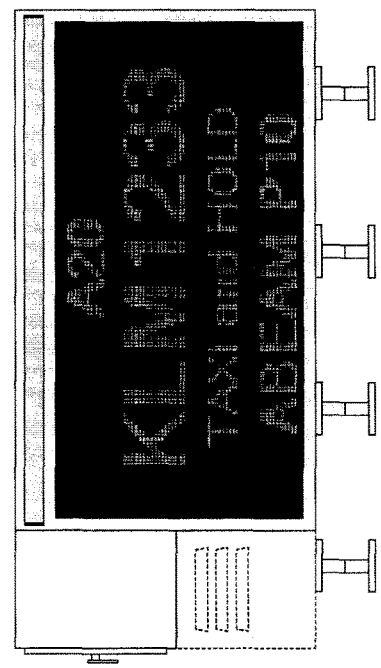
Figure 31:
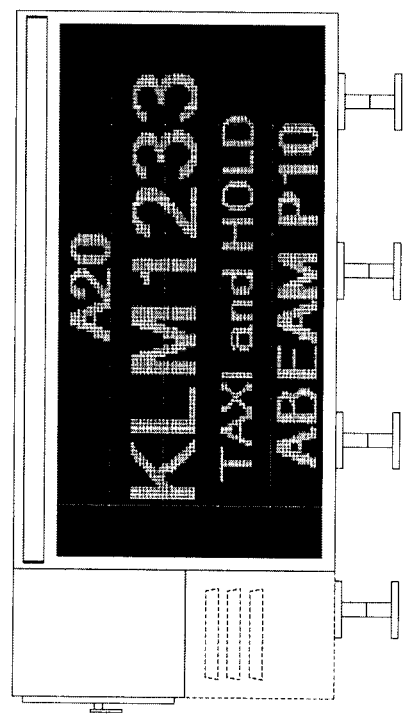

FIGS. 26 and 27 illustrate possible messages to be displayed using the airfield sign disclosed in FIG. 19. The sign may include traffic lights while other signage may have a larger message display area. The sign is intended to display clear messages that are easily readable by the pilots of the aircraft and ground crew.

FIGS. 28 to 31 illustrate optional configurations of the airfield sign displaying a message. In these embodiments, the power unit can be seen from the front views and the air conditioning unit is visible from the side views. The cabinet and posts may be painted gray in order to reduce the likelihood that the colour will provide a distraction to the pilots and ground crew. The signs may display the message in a single colour, or may display multiple colours depending on the configuration of the lights within the sign. Multi-coloured LEDs or other lights may be used to allow for the message to alternate between colours or to allow certain messages like "STOP" to appear in red while other messages like "GO" may appear in green. The messages displayed may be static or may be updated in real-time to provide the aircraft pilots and other airfield personal with updated messages.

Figure 32:
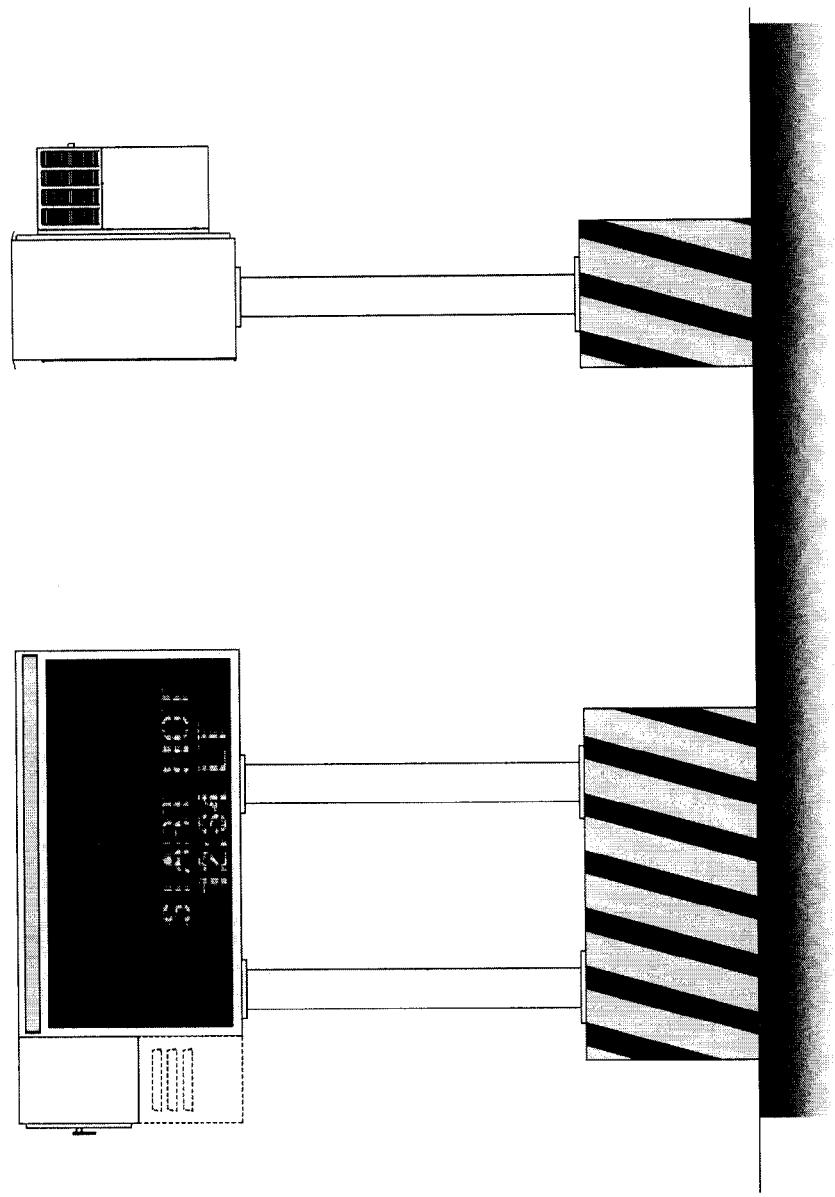
FIGS. 32 and 33 illustrate optional configurations of yet another embodiment of an airfield sign.
Figure 33:
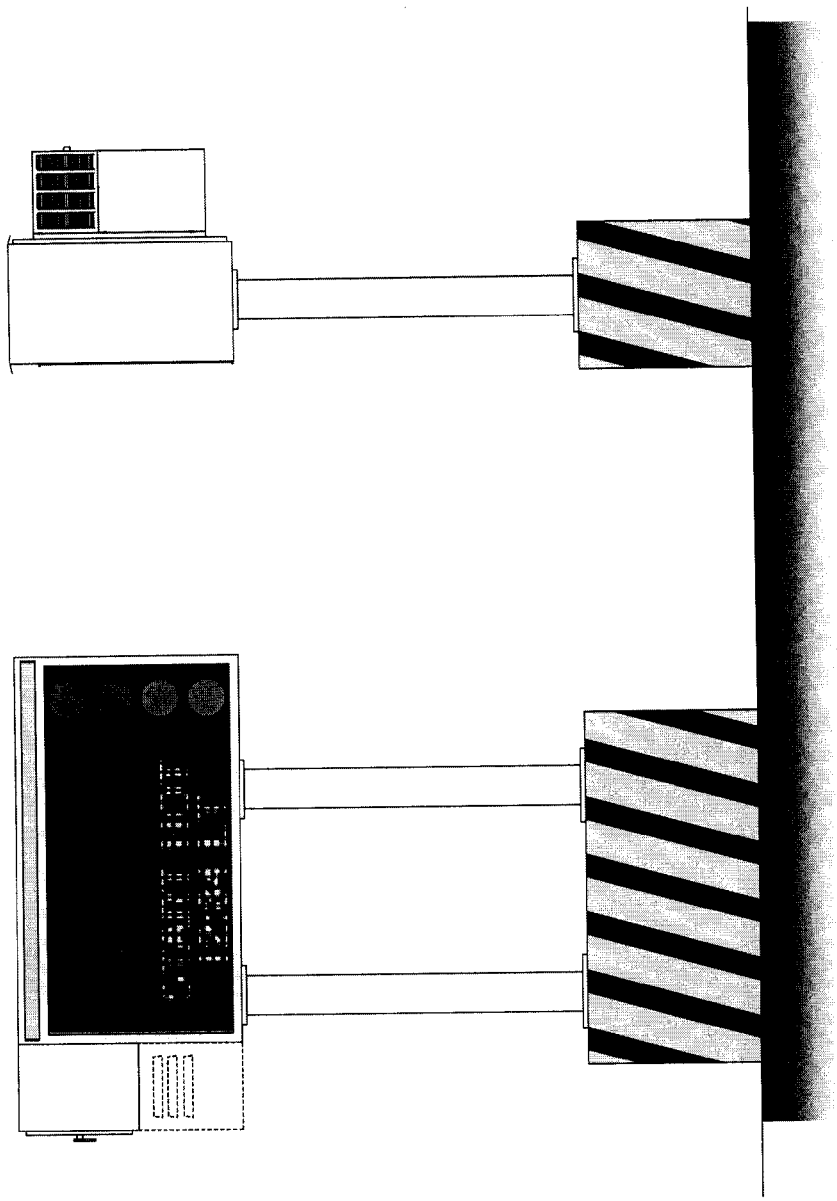

FIGS. 32 and 33 illustrate an embodiment of the airfield sign connected to a concrete base above the ground. The concrete base may be painted or detailed with bright colours, which is intended to promote safety by being very visible. In one example, the concrete base may be painted in yellow and black strips. The concrete base may be attached to the posts through a similarly designed base plate as the base plates described above. Various airfield sign embodiments may be attached to the top of the posts, such as ones with or without traffic lights. The signs may include power units and air conditioning units as described above. In these and other embodiments, the power unit may optionally be available as a separate unit mounted remotely from the sign.

Figure 34:
FIGS. 34 and 35 illustrate an embodiment of an airfield sign in use in an airfield.
Figure 35:
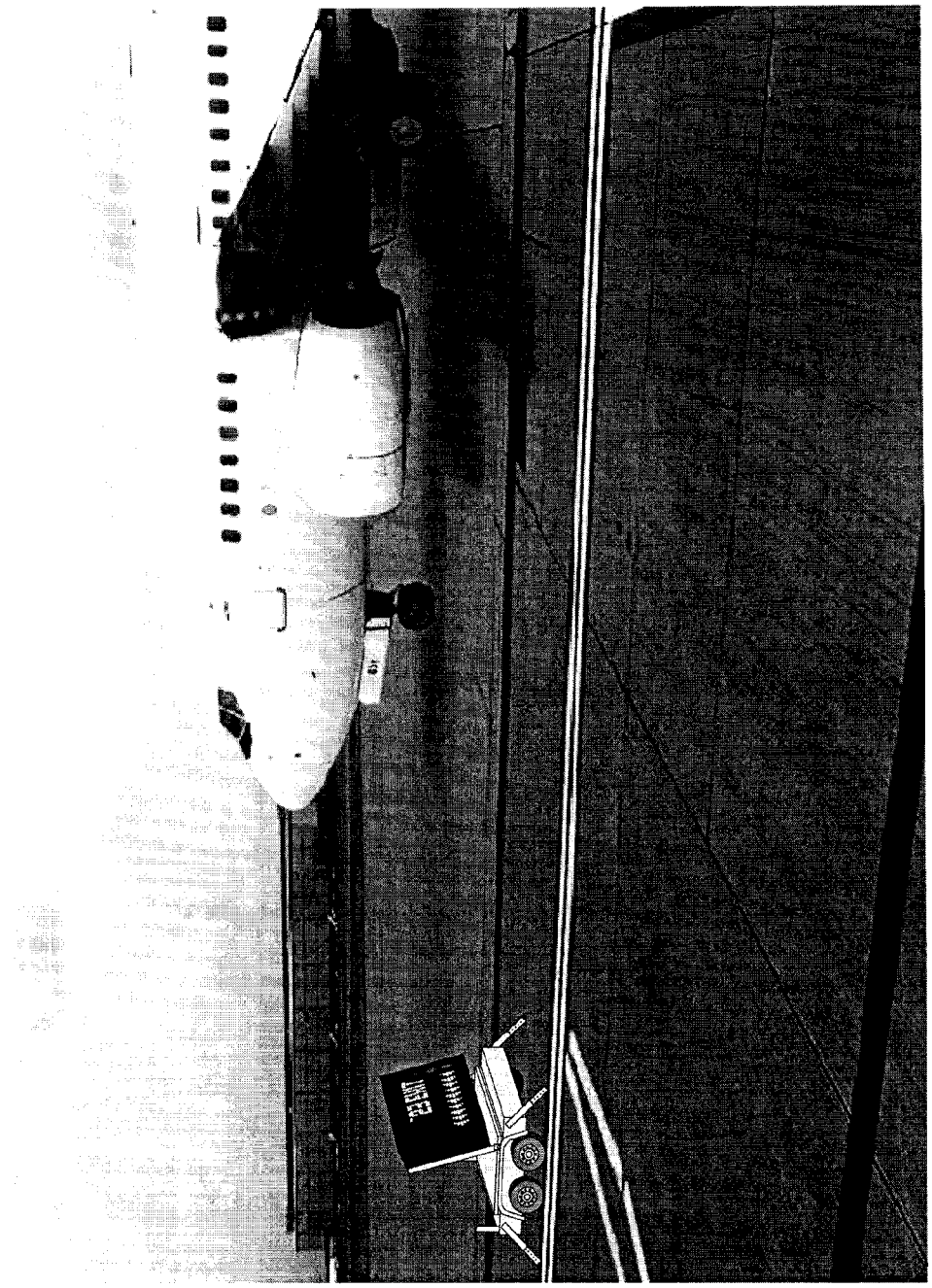

FIGS. 34 and 35 illustrate embodiments of the airfield sign in use in an airfield. As can be seen, the sign is intended to be highly visible to the pilot of the aircraft and the ground crew of the airfield. FIG. 35 shows an angled sign cabinet, which is intended to provide a better viewing angle.

Figure 36:
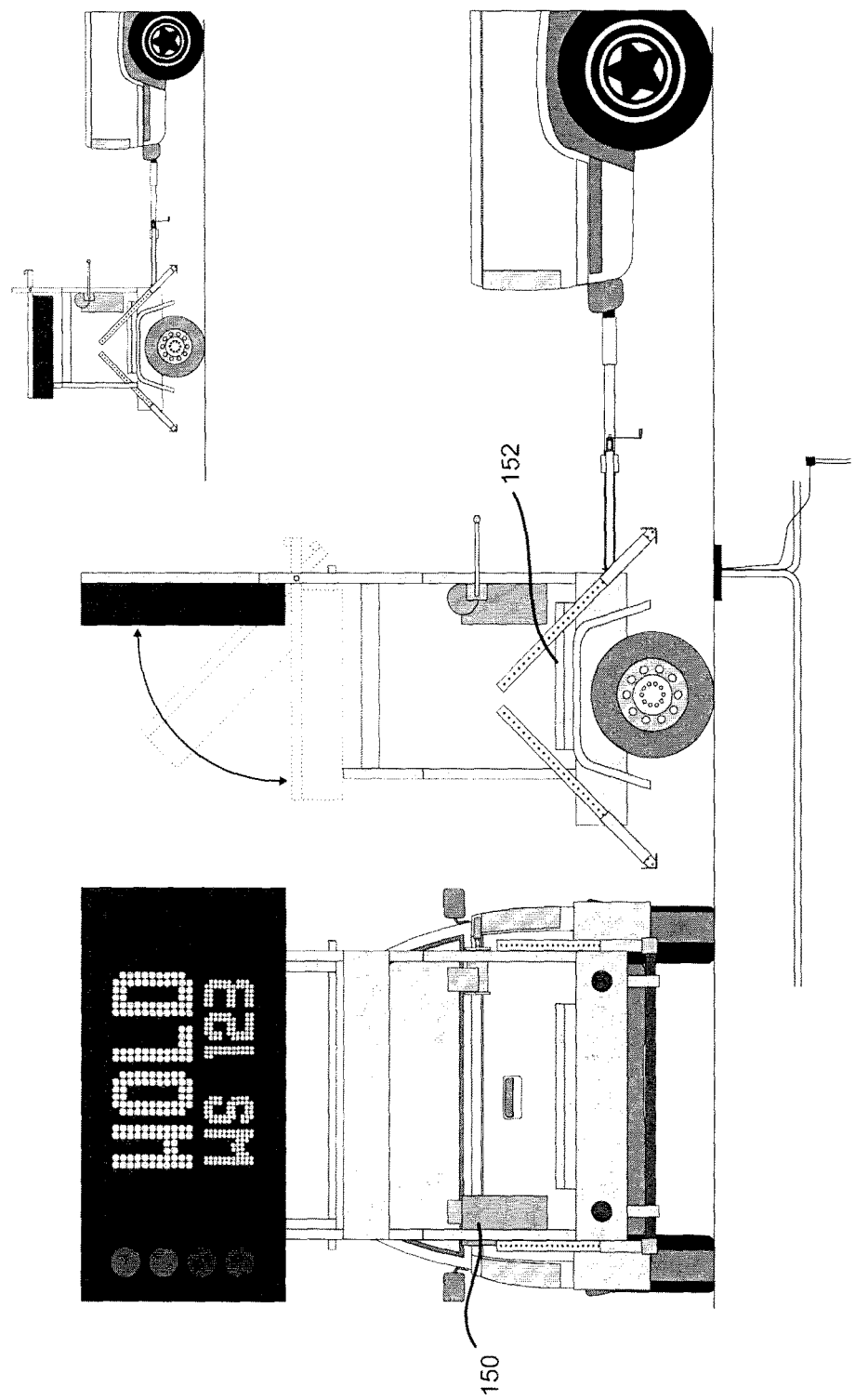
FIGS. 36 to 38 illustrate alternative embodiments of mobile airfield signs.
Figure 37:
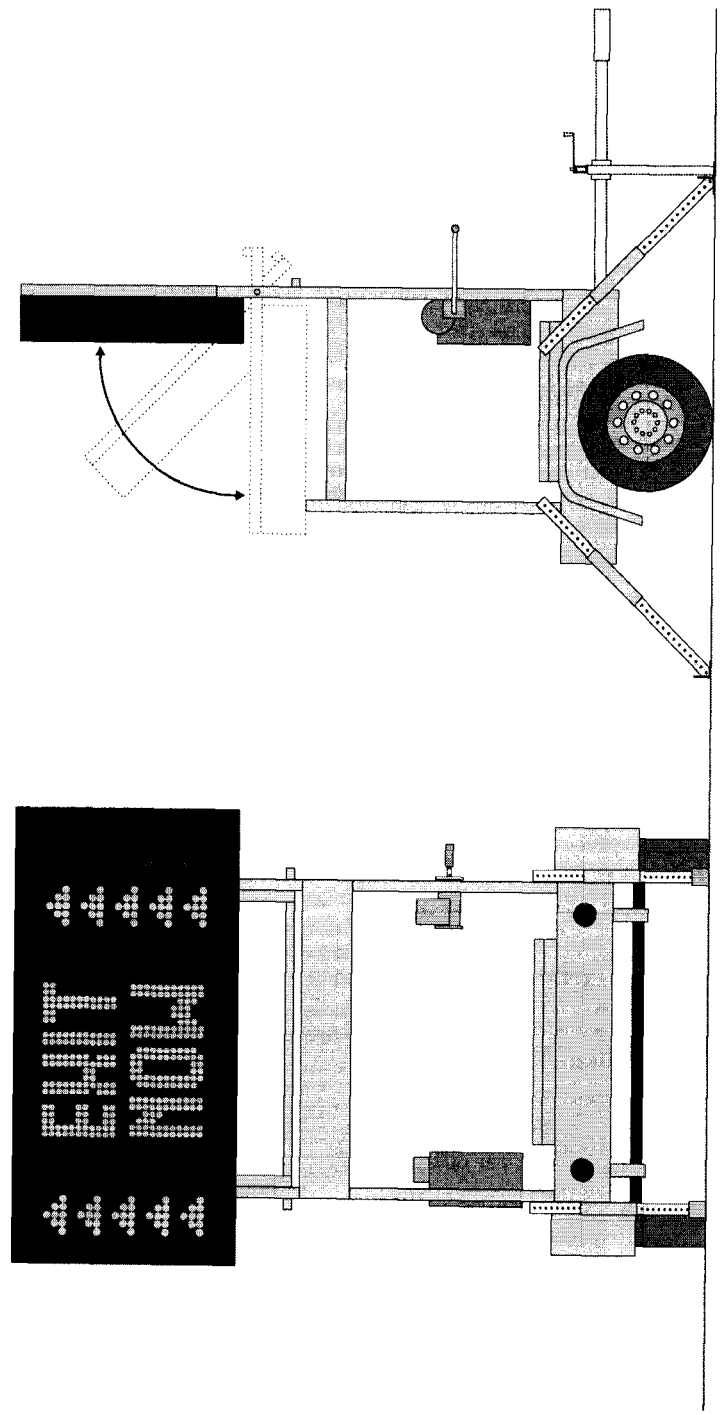
Figure 38:
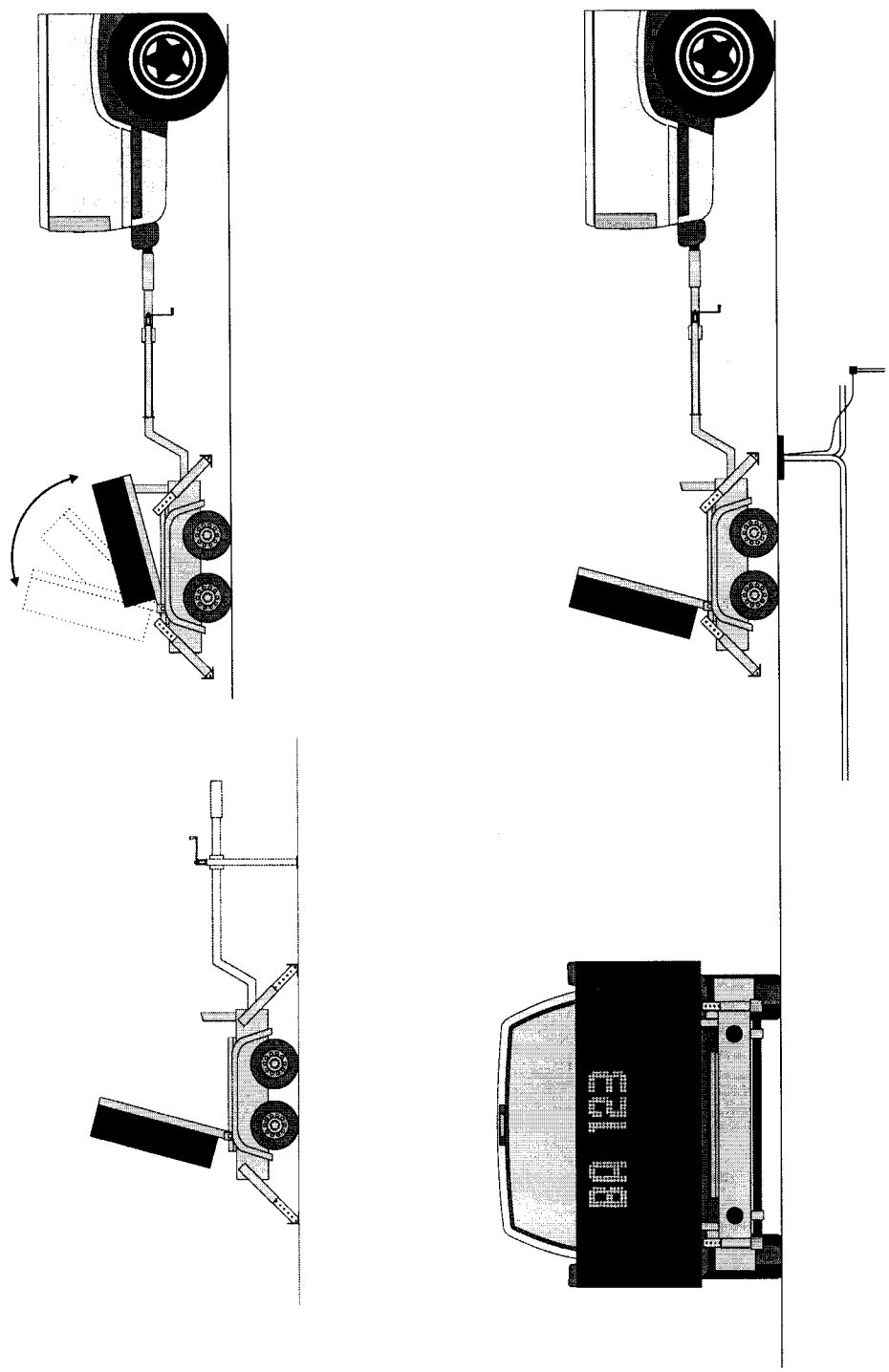

FIGS. 36 to 38 illustrate further embodiments of mobile airfield sign. In use, the sign may be towed to the desired location and then unhitched at that location for use within the airfield signage system. Outriggers may be used to steady the trailer of the sign while bolts through the outrigger may be added to provide further stability. The airfield signs may be folded down for transport and may then be manually or mechanically raised into place one the sign has arrived at its desired location. FIG. 36 illustrates embodiments that include a motorized ratchet 150 in one embodiment and a manual ratchet 152 in another embodiment. Power may be supplied to the airfield sign via a sunken receptacle which may have a ground conductor attached to a thermit weld or compression connector and a ground rod electrode. The sign may receive data from the receptacle or may receive data wirelessly. The base of the sign may contain a step down transformer, a main disconnect, a power distribution panel, a shut down relay, duplex receptacles, a power supply, a network switch and thermostats. In an alternative the sign may be battery powered.

The trailer for the airfield sign may include a hitch attachment designed to engage a hitch of a vehicle. Various hitch attachments could be used depending on the hitch of the vehicle being used for towing the airfield sign trailer. In one embodiment, the trailer can retract as shown in the figures, which is intended to make transportation of the sign easier. Each sign display has a power feed to a programmable module which displays the message. Messages may be made at the sign or through an optional wireless receiving component such as a modem. If the airfield sign employs the use of traffic lights, the lights may be controlled by 120V PLCs. FIG. 37 illustrates the sign of FIG. 36 unhitched from the vehicle. Further the sign trailer may include a removable tongue that can be removed once the outriggers are in place.

FIG. 38 illustrates an alternative embodiment of a mobile airfield sign, similar to the embodiment shown in FIGS. 36 and 37. As in the embodiment of FIGS. 36 and 37, the sign may be transported by a vehicle via a hitch system. The sign cabinet may be raised for viewing and lowered for transportation. A stop may be located on the trailer to prevent the sign cabinet from over rotating.

Figure 39:
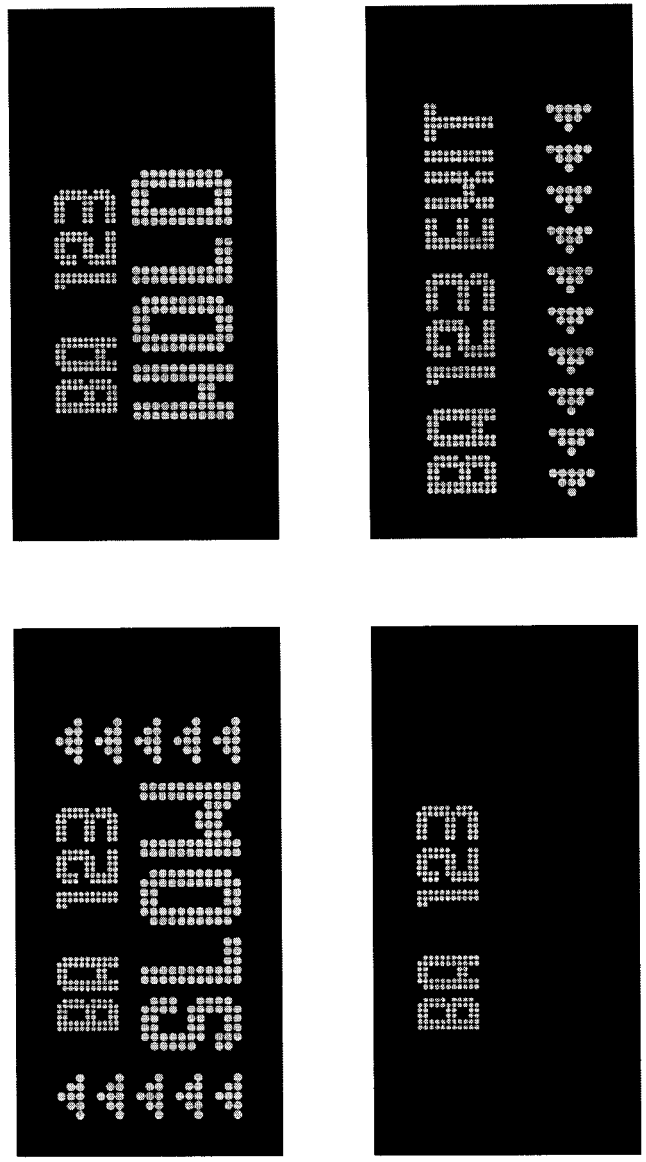
FIG. 39 illustrates optional message configurations for embodiments of an airfield sign.
Figure 40:
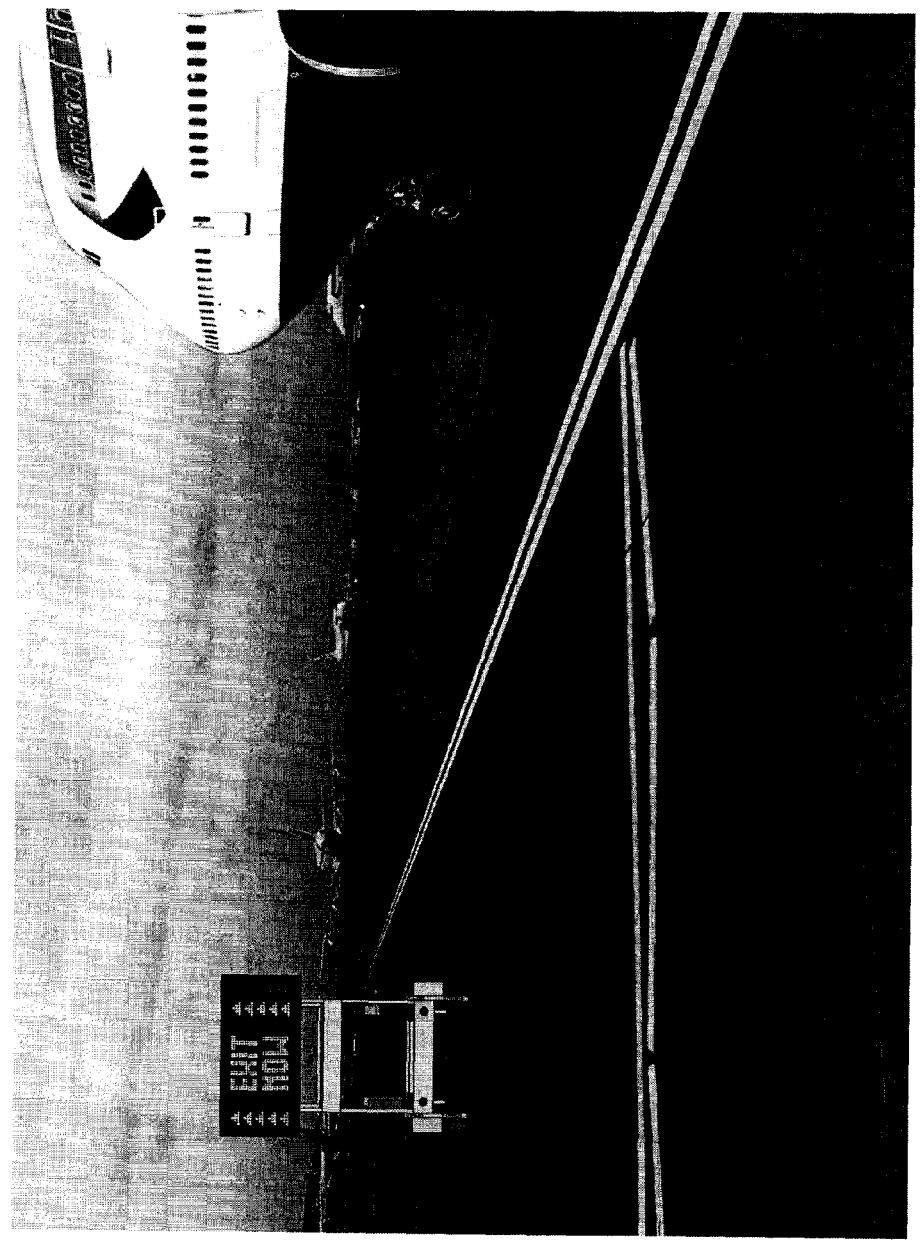
FIGS. 40 to 43 illustrate embodiments of the airfield sign in use in an airfield.
Figure 41:
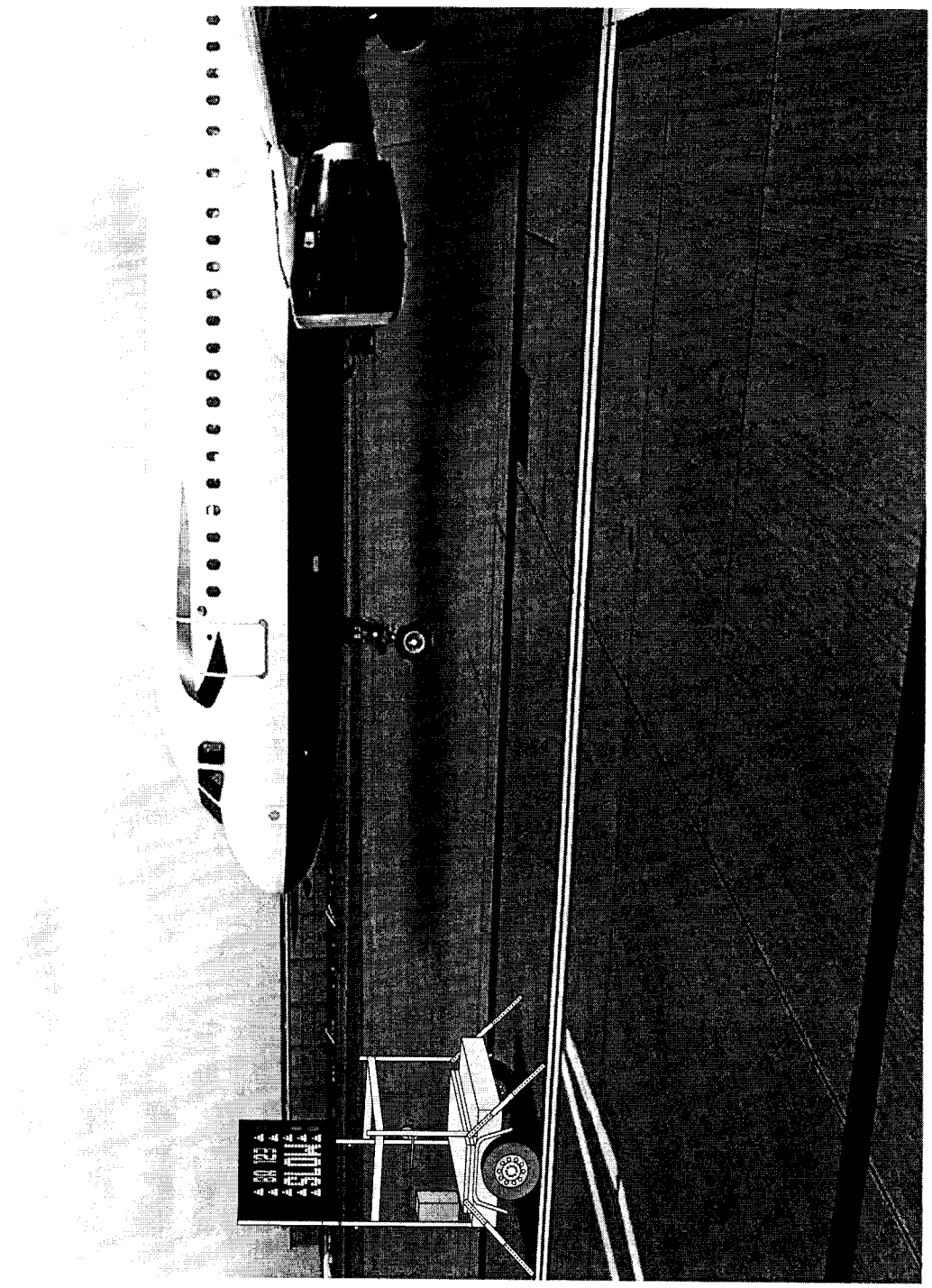
Figure 42:
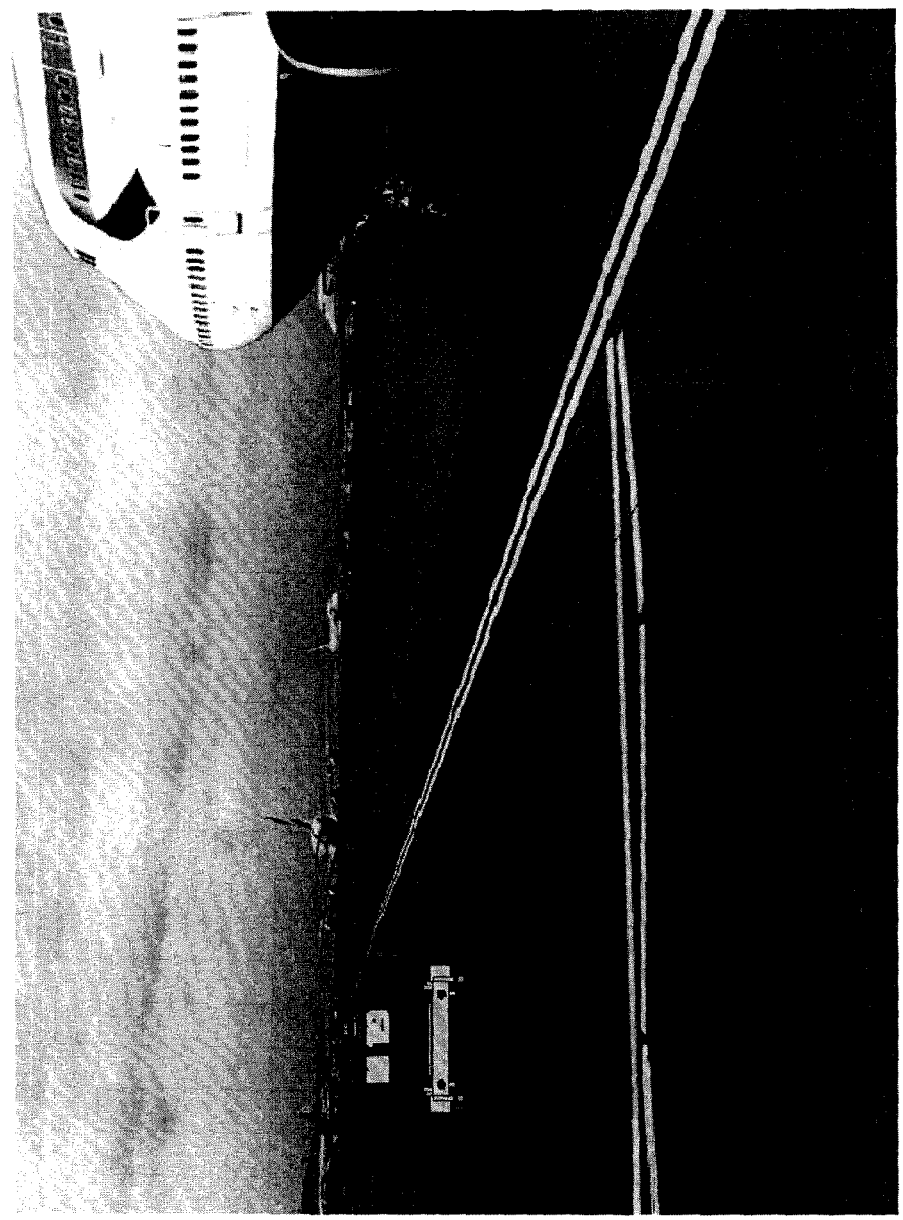
Figure 43:
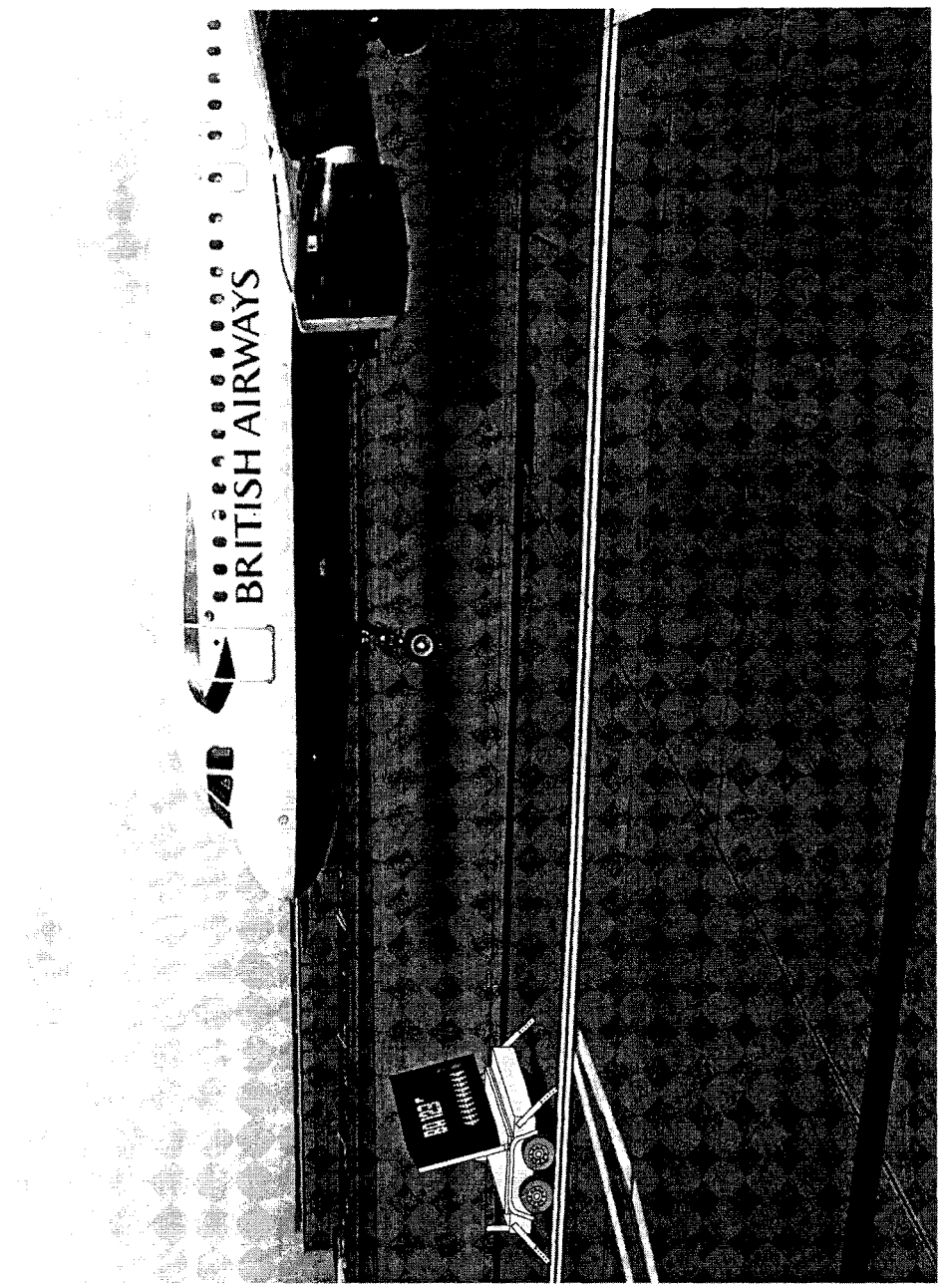

FIG. 39 further illustrates possible messages that may be displayed on either the mobile or stationary airfield signs. The signs may include, but do not necessarily require, traffic lights which may be located on either side of the display area. The display area may display a message in a single colour or may employ multiple colours using either multiple lights or multi-coloured lights. FIGS. 40 to 43 illustrate various embodiments of the airfield sign in use on an airfield.

Figure 44:
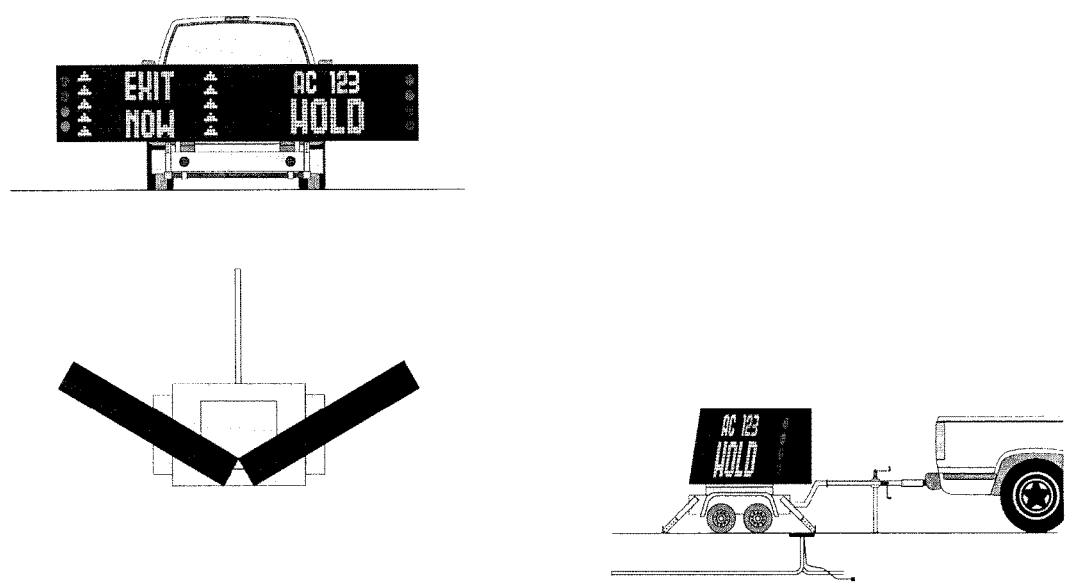
FIGS. 44 to 45 illustrate further embodiments of a mobile airfield sign.
Figure 45:
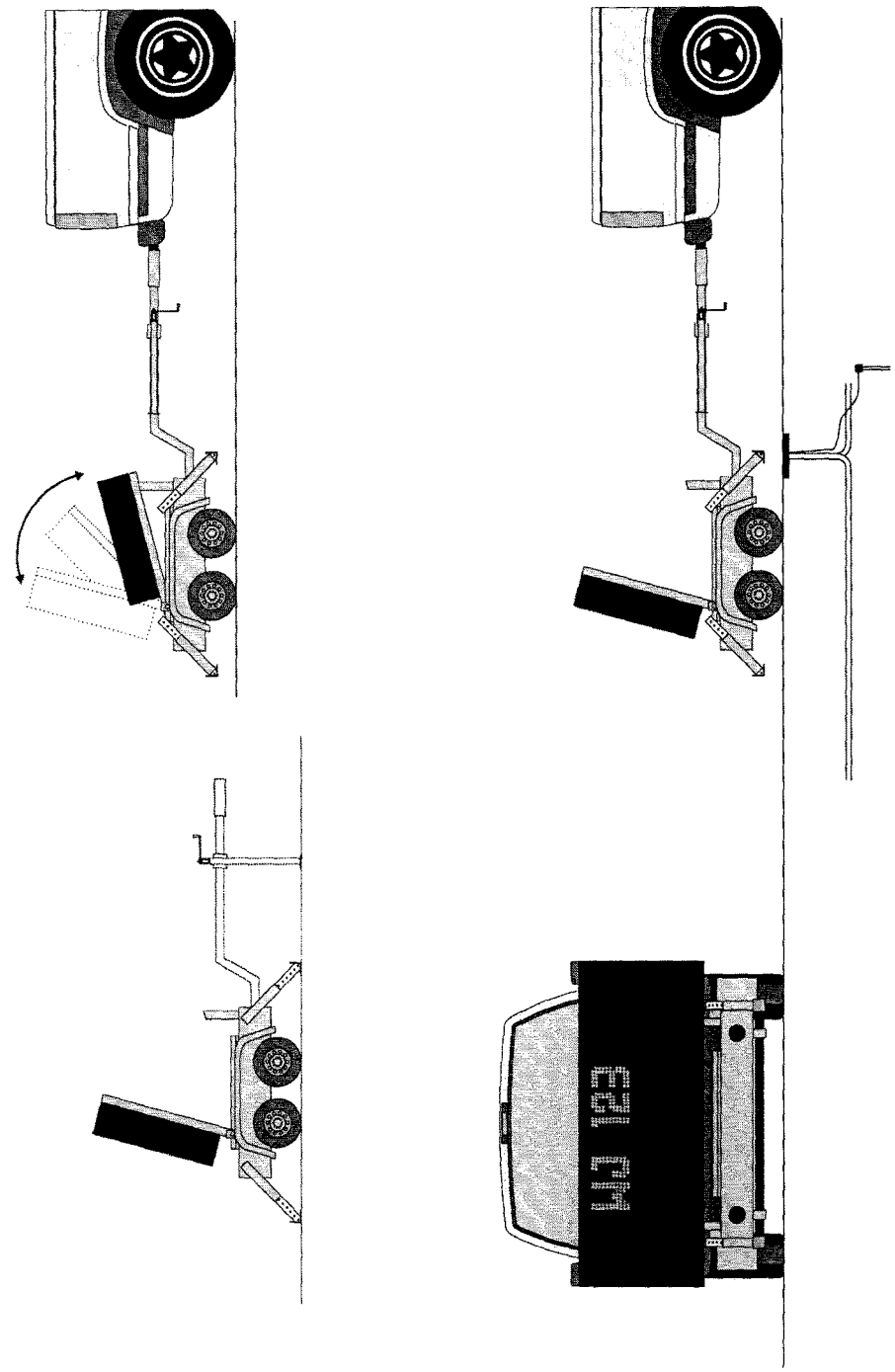

FIGS. 44 and 45 illustrate further embodiments of a mobile airfield sign. As can be seen from FIG. 44, the trailer carrying the airfield sign may be designed to carry multiple signs that may allow the message being displayed to have greater detail, larger print or be angled in such a way that the messages are directed in different directions, for example, at multiple pilots or different recipients. FIG. 45 further illustrates a mobile airfield sign, attached to and detached from a vehicle.

Figure 46:
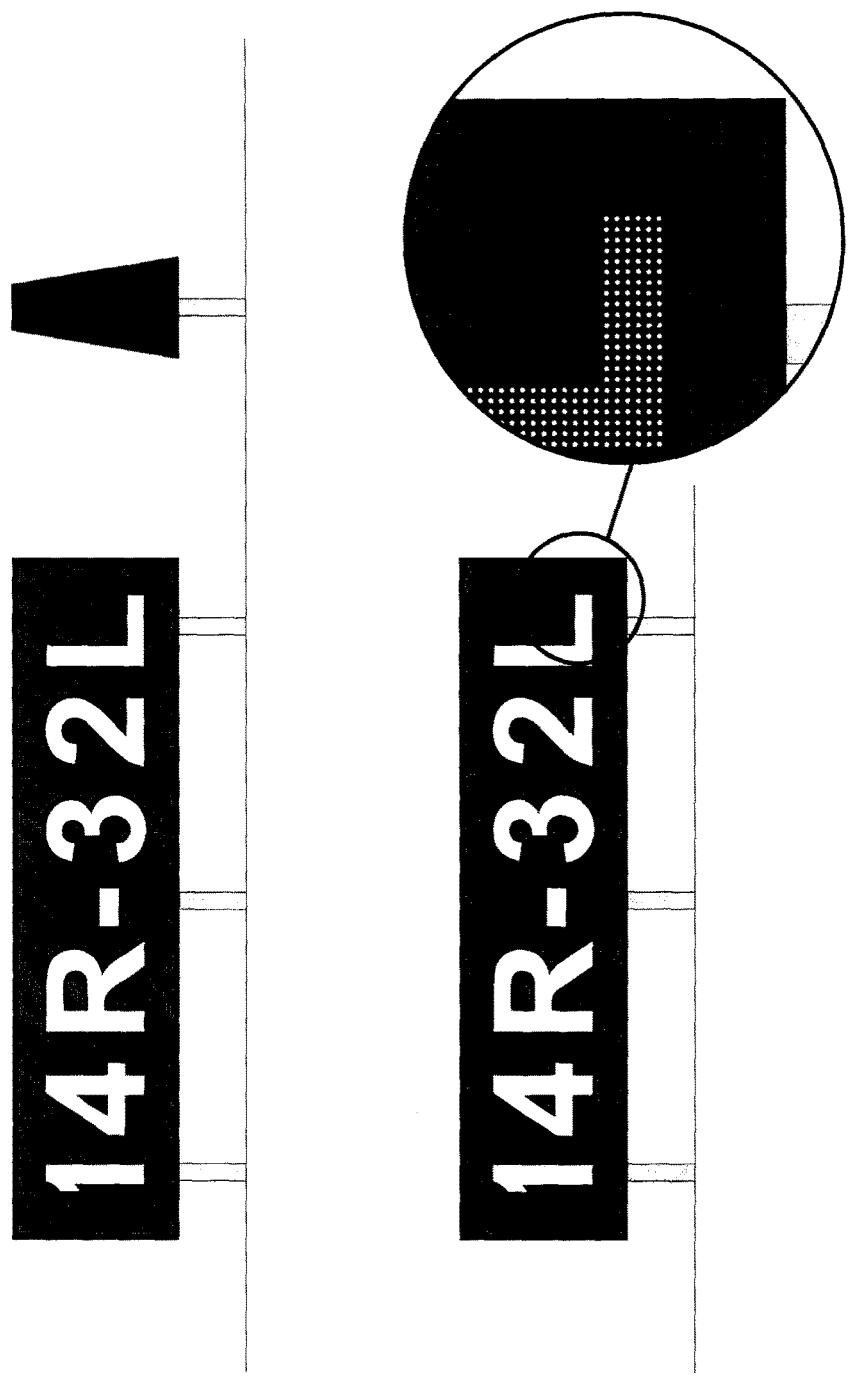
FIGS. 46 to 47 illustrate yet another embodiment of an airfield sign.
Figure 47:
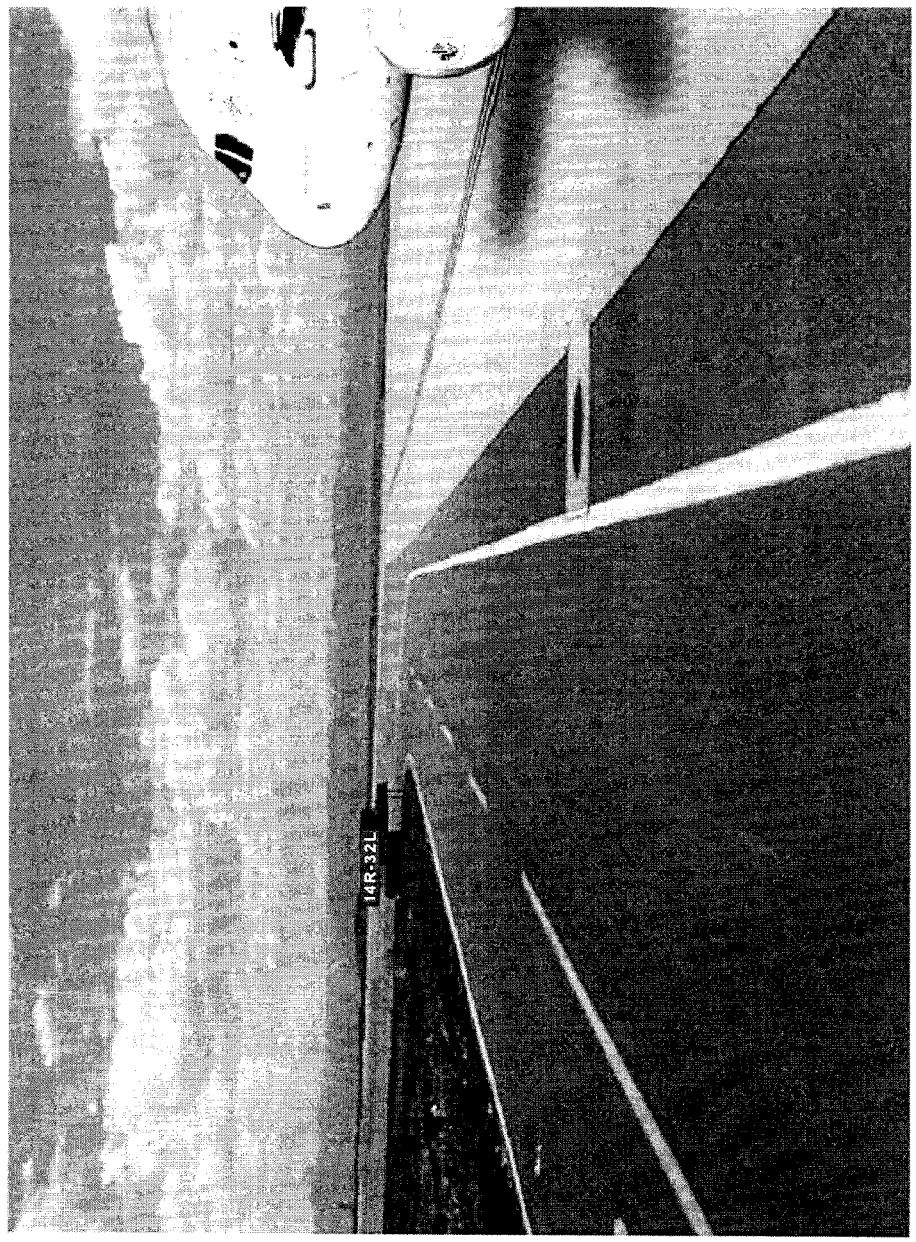

FIGS. 46 and 47 illustrate yet another embodiment of an airfield sign. The sign may include a display area more rectangular in shape and may have characters illuminate white against a coloured background. The sign may include a slightly angled display area which is intended to make the viewing angle of the sign more visible to pilots as shown as used in the airfield in FIG. 47. The lights, which in a preferred embodiment are LEDs, are in clusters of white, red and green, and a black outline may be produced by turning off some of the LEDs to create a void. Each colour may be turned on individually, and other colours besides white, red and green may be used.

Figure 48:
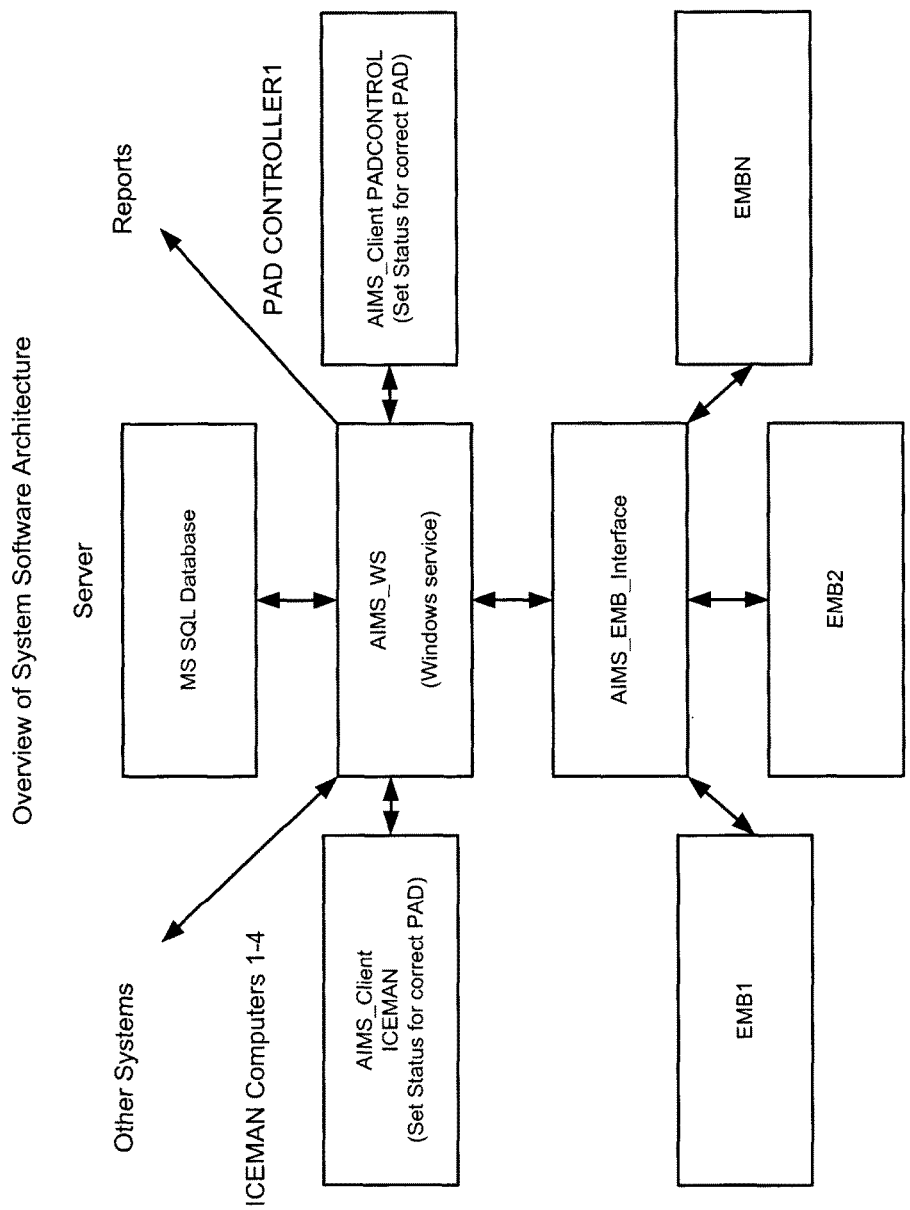
FIG. 48 illustrates an overview of an embodiment of an airfield sign system software architecture.

FIG. 48 illustrates an example of an architecture of an airfield signage system. Each electronic message board (EMB) or message display area of an airfield sign interacts with the system interface within a server. The server further contains a database such as MS SQL database and Windows Service or other operating service. The server is further designed to interact with client and other computers and systems such as Iceman computers and Pad Controllers, described in further detail herein. The server is further designed to run reports related to the airfield software system.

In some cases, the system uses modified LED modules for airport signs as blue is reserved for guidance and has special meaning, which is intended to reduce the risk of confusing pilots and ground crew. Further, redundant controllers are used for the airfield sign in order to provide an aspect of quality control to the system. Each sign has at least two controllers, which are software selectable Master/Slave, in the event of a failure of one board the other can be commanded to take over. This setup is intended to reduce the risk that a sign will fail to display the appropriate message.

In some cases, the airfield sign may use variable fonts, for example, up to eight different font sizes, with completely programmable font shapes, including substitution of unused characters for special characters including chevrons, arrows, and "virtual" stop/go lights. In some cases there may also be physical Stop and Go lights as an option, triggered either by the controllers and software, or via a hardwired contact to the lights providing an additional level of redundancy to the messaging. It is intended that if the messaging system fails the Stop and go lights can still function based on the hardwired input.

The software interface for the airfield signage system may contain several features and operational functions, such as, but not limited to, downloadable fonts, which are intended to be completely variable; web service client interface which may include the following features: 1) Client/Operator Computers operating on thin client computers which may run Windows or another operating system whereby based on the actions of the operator send messages to the Web Service on the servers and may include at least two redundant servers; 2) the servers handle the operator input, and update the local database or in an alternative the database may be external and operatively connected to the server; 3) the servers read the database, and communicate with the data receiving components of the airfield signs; 4) the severs then update the database with the status of the requested action successful or not; 5) the clients contact the server on a timed interval and display the sign status, including faults and the actual message sent to the sign. Other features of the airfield signage system may include redundant server failover, providing in the event of a failure of the primary server a secondary server takes over; remote hard reset of the controller boards via Web based Relay;

Further, the messages displayed on the airfield signs are configurable. Messages may have, multiple lines, multiple fonts on different lines or the same line, and multiple colours on the same line or different lines. Further, background colour control is provided, for example for high contrast messages yellow background with black lettering may be used. In some case, another feature of the message display system includes software based intensity control of the LED's to allow for certain aspects of the message to be displayed in a greater intensity. Message boards may be designed for a specific purpose or may display various messages depending on the need of the airfield. The messages may be, for example, de-icing boards, queuing boards, directory boards, gate direction boards and the like.

Figure 49:
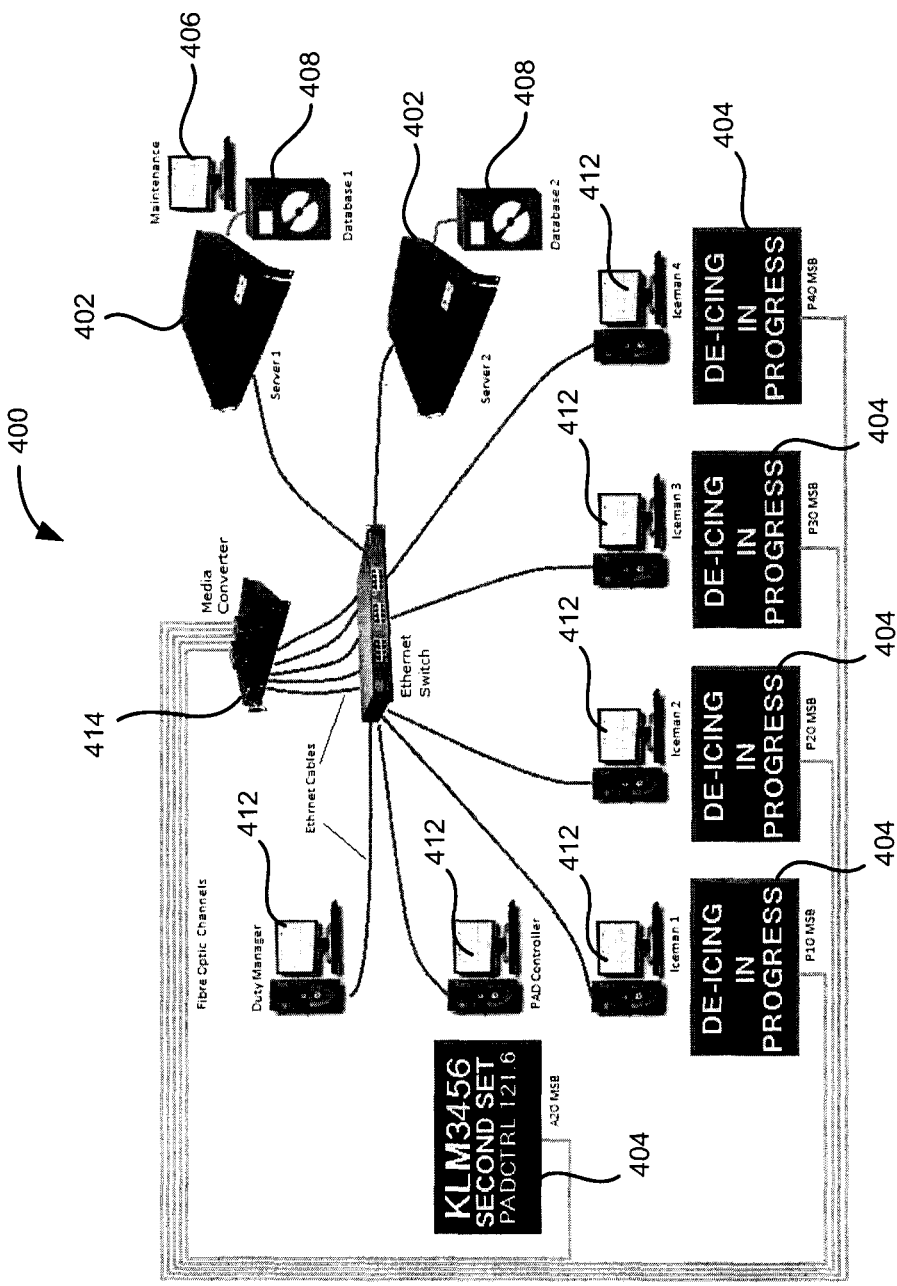
FIG. 49 illustrates an example embodiment of airfield signage system architecture.

In a specific example, a de-icing arrangement is shown with respect to FIG. 49. It will be understood that other arrangements would be able to function similarly. FIG. 49 illustrates an example embodiment of an airfield signage system architecture 400. As described above, at least one server 402 is connected to the system architecture 400 and used for controlling the messages that would appear on the airfield signs 404. The users may have access to client applications executing on the servers or executing on a local machine 406 and connected to the servers. Messages may be stored in a database 408, and the database 408 may be operatively connected to the server 402. In some cases, each server 402 may be connected to a separate database 408.

The airfield signage system design is centered about at least one and preferably two or more servers 402. The servers 402 send the messages to the dynamic display areas of the airfield signs 404. The dynamic display areas may also be seen as electronic message boards (EMBs). At any time, the system is designed to consider one of the servers 402 as the "Active" server and any other server may be designated as "Inactive".

The active server 402 is the server controlling the messages on the message boards 404. The servers 402 monitor any other server 402 for activity, and an Inactive server will become the active server in the event a loss of communication occurs with the active server. The active server 402 may send a message to a switch 410. The switch 410 may be connected to various computers 412 designed to monitor the system and/or the message boards. The switch 410 may further be connected to a media converter 414, which connects the various types of cable to maintain the functions of the airfield system network. Other devices with similar functionality may be used.

Figure 50:
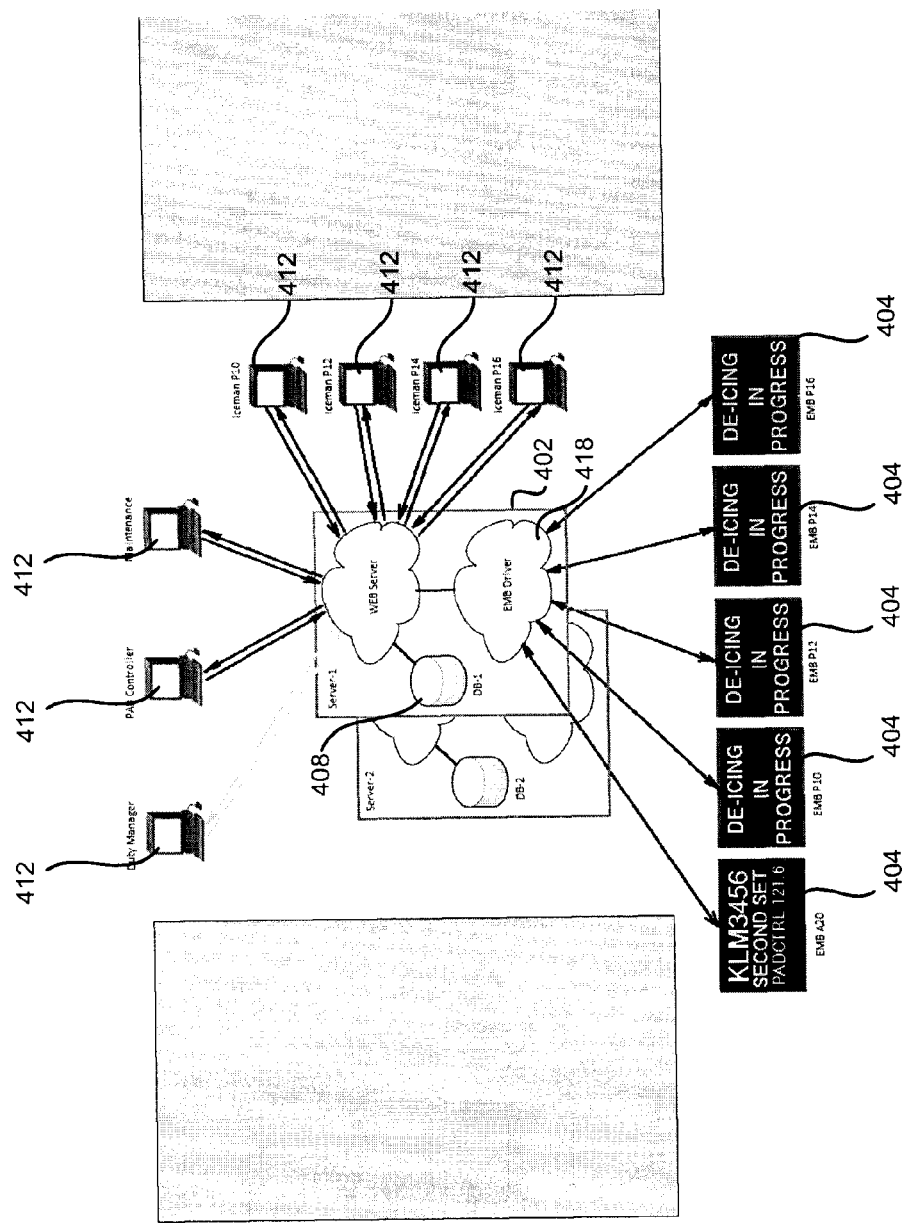
FIG. 50 illustrates the airfield signage system interactions of the embodiment shown in FIG. 49.

FIG. 50 illustrates the system, with a focus on the active server 402. The active server 402 is connected to a database 408. The server 402 may include a web server component which may be wirelessly connected to various user workstations or computers 412. Users may access the system for maintenance, for updating messages or for other desired functions. The server 402 may further include an electronic message board driver 418 which may drive the messages on the electronic message board 404.

The application or applications designed for the users or operators of the system allow the operators to manually assign aircraft to various locations within the facility by displaying messages on the EMBs, and change a state of the aircraft within the system 400. The current state of the aircraft at any location in the deicing system is held in a table, for example a PadStatus table, in the at least one database 408.

Figure 51:
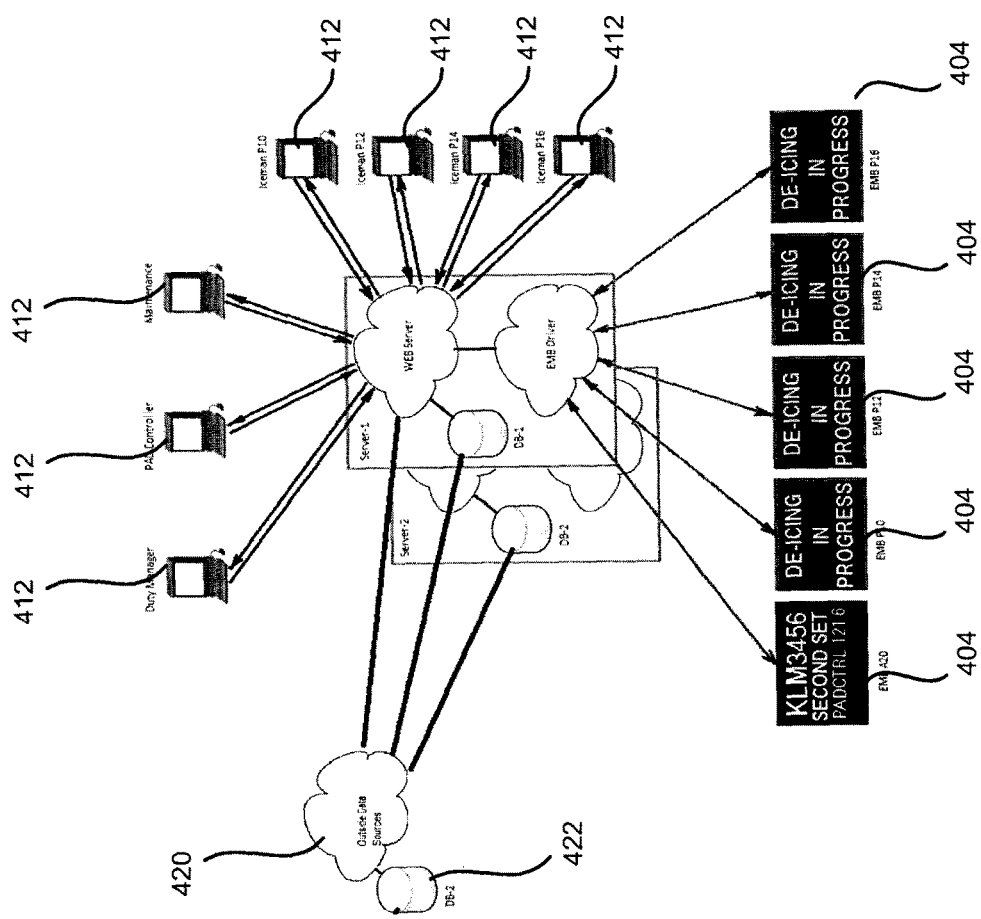
FIG. 51 illustrates the airfield signage system external interactions of the embodiment shown in FIG. 49.

As shown in FIG. 51, the system 400 may additionally be connected to outside data sources 420 or outside databases 422, which could automatically fill in the PadStatus table with information, and automatically change the state of the aircraft and trigger appropriate messages. The outside data sources could "Push" data into the system's database 408 using a third party service or other connected service, or be "Pulled" in from the driver application 418. The reading of other data sources may be done when an exception occurs or on a predetermined time interval. Various types of outside sources are defined above and may communicate with or have hardware connections which interface with the at least one server 402.

Each operator action or data change from an outside source may be communicated to at least the active server and preferable to each server. The data change may change the state of the aircraft. The active server driver 418 monitors the state and changes the messages on the signs accordingly.

Online or web services may be provided by the active and/or inactive servers 402 and may connect the client applications, and other outside data sources with the database 408. Each time data is written to the database 408, it may be written to each of the redundant server databases keeping these databases 408 current. All data read from the database 408 is read from the active server 402. The active server 402 directs the writing messages to the electronic board.

The servers 402 monitor each other through the use of a watchdog entry on a server status database table. Each server 402 increments a watchdog value in the database on the other servers' database. In the event of a loss of communication between the server or an interruption of the driver application 418 the watchdog value stops changing. An inactive server 402 may continue to be an inactive server and marks the failed server as a failed communication, or the inactive server may become the active server and begins to send messages to the message boards.

Various messages or commands may be received through the web server. For example, a duty manager may communicate messages relating to updating the status, including enabling the airport location for sue by the system; closing or opening the hold Abeam locations; close or opening de-icing pads; and/or resetting location, which could include removing an aircraft from a location.

A duty manager status may also receive updates or commands with respect to the de-icing message boards in this example. The updates may related to setting default treatments or fluids, setting a queuing message board, setting an LED intensity for the message boards, setting the ground light intensity or the like. The events or updates may also be written to a table stored within the database.

In one specific example, the system may receive instructions from a pad controller. The instructions received may be directed to update a queue, hold aircraft abeam and assigned to pad or update a pad status. The messages may include entering an aircraft into a specific row, moving the aircraft between locations, removing an aircraft from a queue, hold abeam and assigned locations, or reset a location. Similar to the above, the system may return information to a pad controller in order to provide the controller with information that may be useful in updating and assigning aircrafts to locations. Further, the system may benefit from the use of GPS information with respect to aircraft and pad location.

Each electronic message board 404 may be coupled or in communication with a computer 412. The computer 412 may send commands to the at least one server 402 which may be relayed to the electronic message board. The messages or commands may be used to accept the location of the assigned aircraft or change the aircraft status. Further, messages or commands may be used to determine the fluid type, treatment type and hot time to be used with respect to the aircraft at that de-icing pad referred to or indicated by the de-icing message board.

A user performing maintenance on the system or on an individual pad may send commands to the system to relay to the message boards 404. The messages could include, for example, opening or closing the entire facility, setting the message board driver mode to a test mode, setting test message parameters, testing the LEDs within the message boards, clearing the alarms, and the like.

The electronic message boards 404 may further relay information to at least one server, through the message board driver 418. Messages may include writing or clearing alarms, updating alarms in an event table, delivering messages or commands to the controllers, changing the controller or state, or the like.

Further, messages and status may be returned from the server to the users and/or operators of the system. For example, the status for each location may be returned and may include information such as, time, flight number, requested state, actual state, message, controller status, variable information for messages etc. Further, there may be an alarm table that may be reviewed and presented to the users of the system.

Various tables may be used to accomplish the communication between the users, server 402 and message boards 404. In one particular de-icing example, there are four main operational tables in the database 408 the PadStatus Table, which holds all of the state information for each location, and electronic message boards EMB, the Events Table, the Message Table and the Alarm Table, which are used by all of the user or clients and message board driver applications. In addition to these tables there may be an intermediate table EMBCommands, which is used to hold commands from a Maintenance Client and pass them on to the EMBDriver 418. Finally each application may have a table which holds configuration data specific to that client application.

In some cases, the PadStatus Table is the central table for providing information and status of all of the components of the De-Icing control system. Each physical or functional location has an assigned row in the Table which keeps track of the "State" of the location. Typical locations for a de-icing application are shown below.

| De-Icing Pad | Assigned to Pad | Hold Abeam | Queue position | Duty Manager |
| --- | --- | --- | --- | --- |
| P10-10 | P10-110 | P10-210 | A20-320 | 600 |
| P12-12 | P12-112 | P12-212 | A19-319 | |
| P14-14 | P14-114 | P14-214 | A18-318 | |
| P16-16 | P16-116 | P16-216 | A17-319 | |

For example: The P10, De-Icing Pad has a row assigned to it which contains the state of the system—Message State 3=" ", the current message being sent to the EMB, the status of the EMB controllers, the mode of the software Auto/Manual.

There may further include special states unrelated to the messages being displayed on the signs such as Maintenance Mode out of service due to maintenance, or Duty Manager Mode out of service set by the Duty Manager, System Off as set by maintenance, etc.

An event table may be used in this example to store events. The events may be user, system or externally triggered. Having the events stored will allow a user of the system to review the events with respect to a specific pad, operation or EMB.

A message table may stores the format of the messages with placeholders for the variable information, holds the starting position, colour, and other information related to the messages. The placeholders are replaced by the live data either entered by, for example, the operator, or from outside datasources.

An alarm table may hold the hold the state of the Current Alarms in the system.

A configuration table may store configuration information for the various client applications. This table may store, for example, button locations, text, airport information, etc. in order to dynamically configure the system for each application and client. The EMB driver may also read configuration data from the database, including information on each sign location, address, size, name, and information required to allow it to connect to other datasources for "Pulling" information in.

Restoration of a failed server may require the intervention of Maintenance personnel. Once a server has failed though, an inactive server may replace the active server in directing and executing commands on the system.

In some cases, each EMB contains two controller boards, a Master and a Slave. The Slave board may be considered the default controller, but, if at any time the Slave fails to respond, the Master may assume control. This structure is intended to act as another fail safe in the system in order to reduce the likelihood of the system failing to display a message. The state of the boards is stored in the database as it changes.

The above examples and figures graphically demonstrate the flow of information between the various applications within the system. Although the flow of information is shown with respect to de-icing situations, it will be understood that many for the same functionality would be used for various other commands or messages that may be displayed on electronic message boards in the airfield for other situations.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium also referred to as a computer-readable medium, a processor-readable medium, or a computer usable medium having a computer-readable program code embodied therein. The machine-readable medium can be any suitable tangible, non-transitory medium, including magnetic, optical, or electrical storage medium) including a diskette, compact disk read only memory CD-ROM, memory device volatile or non-volatile, or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. An airfield sign comprising:
   a dynamic display portion;
   a traffic light display portion; and
   a processor, connected to the dynamic display portion and the traffic light portion, for controlling a display of information on the dynamic display portion;
   wherein the dynamic display portion and the traffic light display portion are stored within a transparent housing, the transparent housing including a slanted front face.

2. The airfield sign of claim 1 further comprising a static display area portion.

3. The airfield sign of claim 1 wherein the dynamic display portion is a light emitting diode (LED) display or an electronically illuminated display.

4. The airfield sign of claim 3 wherein the individual light emitting diodes are controlled by the processor.

5. The airfield sign of claim 1 wherein the processor is in communication with a remote server for receiving and transmitting signals.

6. The airfield sign of claim 1 wherein the dynamic display portion is used to display de-icing information.

7. The airfield sign of claim 6 wherein the processor controls a display of de-icing information on the dynamic display portion.

* * * * *